(12) United States Patent
Trelin et al.

(10) Patent No.: US 11,069,017 B1
(45) Date of Patent: Jul. 20, 2021

(54) BIOMETRIC BAG CHECK SYSTEM

(71) Applicant: Alclear, LLC, New York, NY (US)

(72) Inventors: Joe Trelin, New York, NY (US);
Matthew Snyder, New York, NY (US)

(73) Assignee: ALCLEAR, LLC, New York, NY (US)

( * ) Notice: Subject to any disclaimer, the term of this patent is extended or adjusted under 35 U.S.C. 154(b) by 225 days.

(21) Appl. No.: 16/160,431

(22) Filed: Oct. 15, 2018

(51) Int. Cl.
*G06Q 50/26* (2012.01)
*G06F 21/32* (2013.01)
*G06K 9/00* (2006.01)

(52) U.S. Cl.
CPC ........... *G06Q 50/265* (2013.01); *G06F 21/32* (2013.01); *G06K 9/00885* (2013.01)

(58) Field of Classification Search
None
See application file for complete search history.

(56) References Cited

U.S. PATENT DOCUMENTS

| | | | |
|---|---|---|---|
| 5,650,768 A * | 7/1997 | Eswaran | G07B 15/00 340/522 |
| 6,108,636 A * | 8/2000 | Yap | A45C 13/42 705/5 |
| 8,381,969 B1 | 2/2013 | Miller et al. | |
| 8,423,462 B1 | 4/2013 | Amacker et al. | |
| 8,521,131 B1 | 8/2013 | Ramalingam et al. | |
| 8,744,966 B1 | 6/2014 | Amacker et al. | |
| 9,107,064 B1 | 8/2015 | Ramalingam et al. | |
| 9,166,961 B1 | 10/2015 | Johansson et al. | |
| 9,202,105 B1 | 12/2015 | Wang et al. | |
| 9,324,098 B1 | 4/2016 | Agrawal et al. | |
| 9,386,507 B1 | 7/2016 | Ramalingam et al. | |
| 9,607,138 B1 | 3/2017 | Baldwin et al. | |
| 9,609,577 B1 | 3/2017 | Ramalingam et al. | |

(Continued)

FOREIGN PATENT DOCUMENTS

JP        200779656 A   *   3/2007

OTHER PUBLICATIONS

M. A. Sasse, "Red-Eye Blink, Bendy Shuffle, and the Yuck Factor: a User Experience of Biometric Airport Systems," in IEEE Security & Privacy, vol. 5, No. 3, pp. 78-81, May-Jun. 2007, doi: 10.1109/MSP.2007.69. (Year: 2007).*

(Continued)

*Primary Examiner* — Lynda Jasmin
*Assistant Examiner* — Laura Yesildag
(74) *Attorney, Agent, or Firm* — Brownstein Hyatt Farber Schreck, LLP

(57) ABSTRACT

A biometric bag check system includes one or more bag accepting devices, bag transport devices, and/or bag delivery devices. A bag accepting device is operable to obtain control of a bag from a person, obtain a digital representation of a biometric from the person, use a biometric identification system to determine an identity for the person using the digital representation of the biometric, verify flight information for the person by communicating with an airline system using the identity, and route the bag upon verification of the flight information. A bag transport device is operable to receive the bag from the bag accepting device and transport the bag. A bag delivery device is operable to receive the bag from the bag transport device and deliver the bag to the person.

20 Claims, 20 Drawing Sheets

(56) References Cited

U.S. PATENT DOCUMENTS

| | | | |
|---|---|---|---|
| 9,656,767 B2* | 5/2017 | Roux | B64F 1/368 |
| 9,681,350 B1 | 6/2017 | Marupaduga et al. | |
| 9,681,359 B2 | 6/2017 | Ramalingam et al. | |
| 9,723,131 B1 | 8/2017 | Ramalingam et al. | |
| 9,836,642 B1 | 12/2017 | Ramaswamy | |
| 9,934,504 B2 | 4/2018 | Wang et al. | |
| 9,967,250 B2 | 5/2018 | Johansson et al. | |
| 10,027,662 B1 | 7/2018 | Mutagi et al. | |
| 10,055,740 B2 | 8/2018 | Hanson et al. | |
| 10,104,181 B1 | 10/2018 | Rao et al. | |
| 10,108,791 B1 | 10/2018 | Masterman | |
| 10,108,961 B2 | 10/2018 | Wang et al. | |
| 10,122,727 B2 | 11/2018 | Johansson et al. | |
| 10,235,669 B2 | 3/2019 | Amacker et al. | |
| 10,242,364 B2 | 3/2019 | Wang et al. | |
| 10,243,945 B1 | 3/2019 | Kruse et al. | |
| 2003/0149343 A1* | 8/2003 | Siegel | G07C 9/27 600/300 |
| 2008/0024271 A1* | 1/2008 | Oberman | G06Q 20/341 340/5.82 |
| 2014/0162598 A1* | 6/2014 | Villa-Real | G06Q 20/363 455/411 |
| 2016/0189507 A1* | 6/2016 | Rayner | A45C 13/18 340/572.1 |
| 2018/0007060 A1 | 1/2018 | Leblang et al. | |
| 2018/0032713 A1* | 2/2018 | Cornick | G07C 9/37 |
| 2018/0253540 A1* | 9/2018 | Cornick | H04L 9/3231 |
| 2019/0036939 A1 | 1/2019 | Johansson et al. | |

OTHER PUBLICATIONS

R. Arora, A. Garg and M. Sareen, "Framework for augmenting security systems at airports," 2016 6th International Conference—Cloud System and Big Data Engineering (Confluence), Noida, 2016, pp. 231-235, doi: 10.1109/CONFLUENCE.2016.7508119. (Year: 2016).*

R. T. Hans, "Using a biometric system to check-in and check-out luggage at airports," 2014 International Symposium on Biometrics and Security Technologies (ISBAST), Kuala Lumpur, 2014, pp. 63-66, doi: 10.1109/ISBAST.2014.7013095. (Year: 2014).*

R. T. Hans, "Using a biometric system to check-in and check-out luggage at airports," 2014 International Symposium on Biometrics and Security Technologies (ISBAST), Kuala Lumpur, Malaysia, 2014, pp. 63-66, doi: 10.1109/ISBAST.2014.7013095. (Year: 2014).*

* cited by examiner

BIOMETRIC BAG CHECK SYSTEM

FIELD

The described embodiments relate generally to bailment systems, such as baggage check systems. More particularly, the present embodiments relate to a biometric bailment system, such as a biometric bag check system.

BACKGROUND

People or entities take possession of the property of others in a variety of different bailment systems. One example of such a bailment system is bag checking at airports or similar arrangements.

At airports, people typically bring their bags to a bag check counter. At such a counter, a clerk typically takes the bags, checks identification and boarding passes, and places tags on the bags that can be read by baggage handlers to determine what flights to place the bags on. The clerk then typically delivers the bags to the baggage handlers, who read the tags when necessary to determine where to take the bags next. Eventually, the baggage handlers leave the bags at baggage carousels assigned to the respective flights.

SUMMARY

The present disclosure relates to a biometric bag check system. The biometric bag check system includes a number of interconnected components that obtain a bag, associate the bag with an identity, and route the bag from origin to destination according to the identity. This allows for a variety of additional functionality over typical systems while improving convenience for users and improving the efficiency of such systems and using fewer resources than were previously possible. Such functionality may include automated bag accepting devices, the ability to alter routing if people do not pass security or board flights, customized and/or secure bag delivery, and so on.

In various embodiments, a biometric bag check system includes a bag accepting device operable to obtain control of a bag from a person, obtain a digital representation of a biometric from the person, use a biometric identification system to determine an identity for the person using the digital representation of the biometric, verify flight information for the person by communicating with an airline system using the identity, and route the bag upon verification of the flight information. The biometric bag check system also includes a bag transport device operable to receive the bag from the bag accepting device and transport the bag. The biometric bag check system further includes a bag delivery device operable to receive the bag from the bag transport device and deliver the bag to the person.

In some examples, the biometric bag check system uses the identity to determine whether the person passed a security checkpoint and determines whether to alter transport of the bag if the person did not pass the security checkpoint. In numerous examples, the biometric bag check system uses the identity to determine whether the person boarded a flight associated with the flight information and determines whether to alter transport of the bag if the person did not board the flight. In various examples, the biometric bag check system determines whether to screen the bag based on the identity.

In numerous examples, the bag accepting device tags the bag to associate the bag with the identity. In other examples, the bag accepting device provides a tag that associates the bag with the identity. In some implementations of such examples, the bag accepting device monitors while the person attaches the tag to the bag. In some examples of such implementations, the bag accepting device interrupts routing of the bag if the bag accepting device is unable to monitor the person attaching the tag to the bag.

In various examples, the biometric bag check system uses the identity to transmit a notification that the bag is ready for delivery from the bag delivery device. In some such examples, the notification includes instructions to enable delivery.

In numerous examples, the bag accepting device verifies that control of the bag is obtained from a same person who provides the digital representation of the biometric prior to routing the bag. In some examples, the person is a first person, the flight information authorizes routing of the bag for a second person, and the bag accepting device verifies that the flight information authorizes the first person to check the bag for the second person prior to routing the bag.

In some embodiments, a bag accepting device includes at least one non-transitory medium that stores instructions, a biometric reader device, and at least one processor communicably coupled to the biometric reader device. The at least one processor executes the instructions to obtain control of a bag from a person, obtain an identity for the person using a digital representation of a biometric obtained via the biometric reader device, communicate with an airline system to verify flight information for the person using the identity, and route the bag using a biometric bag check system upon verification of the flight information.

In various examples, the bag accepting device obtains the identity from a biometric identification system. In some examples, the bag accepting device obtains the identity from a biometric identification system in response to transmitting the digital representation of the biometric to the biometric identification system. In numerous examples, the bag accepting device prevents the person from accessing the bag prior to routing after obtaining control.

In numerous embodiments, a bag delivery device includes at least one non-transitory medium that stores instructions and at least one processor. The at least one processor executes the instructions to receive a bag routed via a biometric bag check system wherein the biometric bag check system associates the bag with an identity of a person determined using a received biometric, transmits a notification regarding possession of the bag using the identity, and provides the bag to the person.

In some examples, the bag delivery device further includes a biometric reader device and the at least one processor receives a digital representation of a biometric from the person using the biometric reader device, uses the digital representation of the biometric to verify the identity of the person with a biometric identification system, and provides the bag upon verification of the identity. In various examples, the bag delivery device further includes a locker and the at least one processor provides the bag by opening the locker. In numerous examples, the notification specifies a location of the bag.

BRIEF DESCRIPTION OF THE DRAWINGS

The disclosure will be readily understood by the following detailed description in conjunction with the accompanying drawings, wherein like reference numerals designate like structural elements.

DETAILED DESCRIPTION

Figure 1:
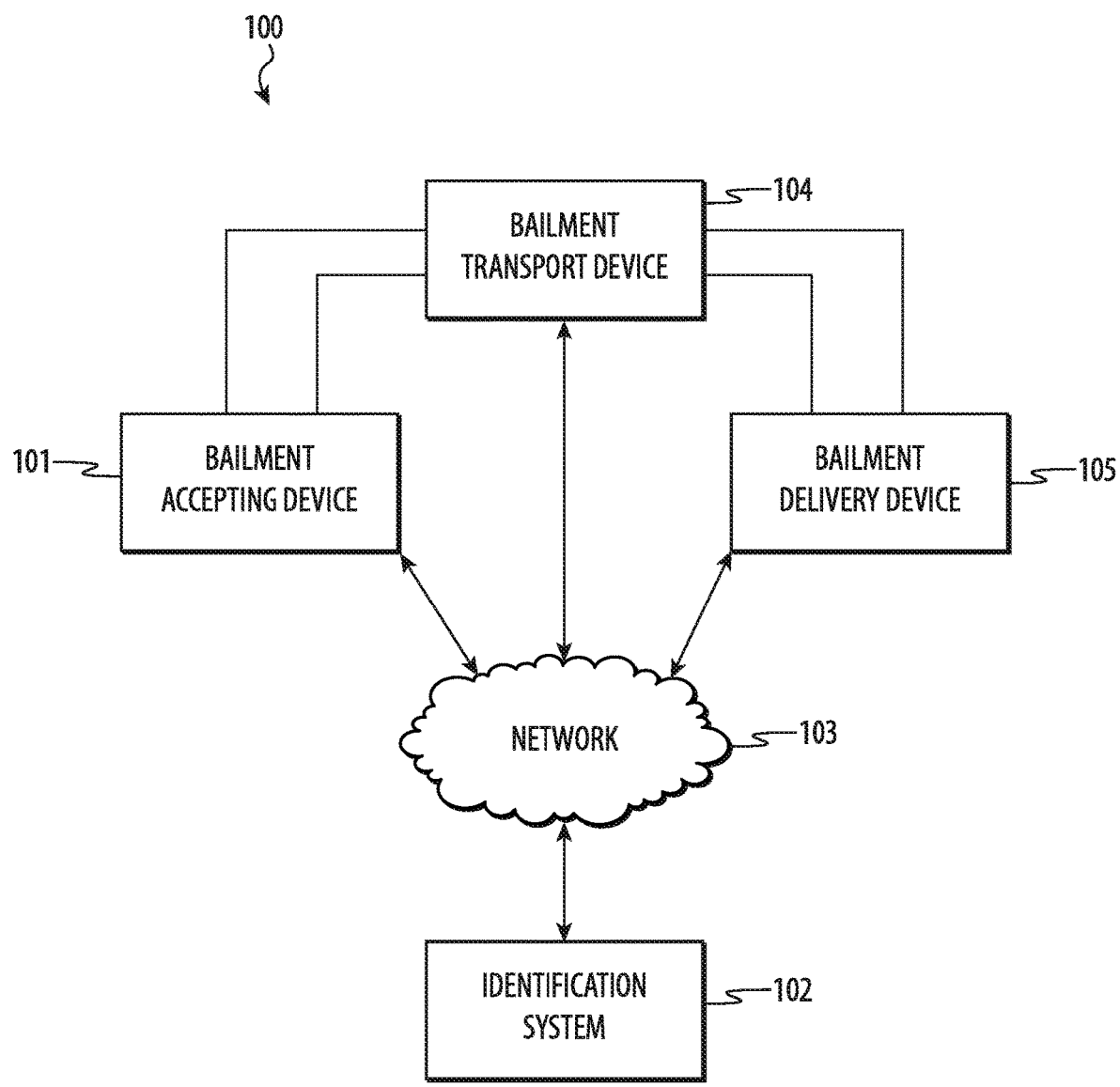
FIG. 1 depicts an example bailment system.

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

The description that follows includes sample systems, methods, and computer program products that embody various elements of the present disclosure. However, it should be understood that the described disclosure may be practiced in a variety of forms in addition to those described herein.

Typical bag check and/or other bailment systems are often inefficient, inconvenient, and/or inflexible. People checking bags typically have to wait for clerks, have to carry appropriate identification and boarding passes, and have few options for altering arrangements once the bag is checked. Similarly, though technology is often used for portions of bag check arrangements, technology use is often piecemeal and the various components used are not interconnected and do not have the ability to adjust to changed circumstances or provide more than the basic bag check service.

The following disclosure relates to a biometric bag check system. The biometric bag check system includes a number of interconnected components that obtain a bag, associate the bag with an identity, and route the bag from origin to destination according to the identity. This allows for a variety of additional functionality over typical systems while improving convenience for users and improving the efficiency of such systems and using fewer resources than were previously possible. Such functionality may include automated bag accepting devices, the ability to alter routing if people do not pass security or board flights, customized and/or secure bag delivery, and so on.

These and other embodiments are discussed below with reference to FIGS. 1-13B. However, those skilled in the art will readily appreciate that the detailed description given herein with respect to these Figures is for explanatory purposes only and should not be construed as limiting.

A bailment is when a first person, persons, entity, and/or entities takes control and responsibility for one or more items from a second person, persons, entity, and/or entities. For example, it is a bailment when an airline or similar entity takes control and responsibility for one or more bags of a passenger in a bag check system. The airline typically takes control of a bag upon check, transports the bag, and provides the bag back to the passenger. The airline may have a responsibility to the passenger for the bag during their possession and may have a responsibility to the passenger to return the bag safely. The airline may also have responsibilities to various authorities regarding security involving the bag. However, this is an example and a bailment may occur any time control of an item is undertaken for the benefit of another.

FIG. 1 depicts an example bailment system 100. The example bailment system 100 may include one or more bailment accepting devices 101, bailment transport devices 104, and/or one or more bailment delivery devices 105 that may be interconnected and may be operable to communicate with one or more identity or identification systems 102 via one or more communication networks 103.

The bailment accepting device 101 may obtain control of an item (such as using one or more mechanisms that secure control of an item including, but not limited to, one or more lockers, closeable apertures, conveyors, locking mechanisms, and so on), communicate with the identification system 102 to determine an identity to associate with the item, and/or route the item via the bailment transport device 104. Routing the item may involve providing the item to the bailment transport device 104, otherwise allowing the bailment transport device 104 to obtain the item, and so on. The bailment transport device 104 may obtain the item from the bailment accepting device 101, route the item according to instructions received from one or more various other devices (such as according to status updates or other notifications associated with the identity that the bailment transport device 104 receives from the identification system 102 and/or other device), transport the item, and/or provide the item to the bailment delivery device 105. The bailment delivery device 105 may provide the item.

For example, the bailment delivery device 105 may return the item to the person who provided the item to the bailment accepting device 101. In some examples, the bailment delivery device 105 may authenticate that the person to whom the item is returned is authorized to claim the item. For example, the bailment delivery device 105 may ensure that the person claiming the item is the person who provided the item to the bailment accepting device 101. In some examples, the bailment delivery device 105 may use the identification system 102 to authenticate the identity of the person claiming the item. The bailment delivery device 105 may include various mechanisms for securing and/or providing access to items (such as one or more delivery conveyors or carousels, lockers, keypads or other input mechanisms for receiving authorization codes or digital representations of biometrics other input, and so on), transmitting notifications regarding held items (such as one or more locations, pickup instructions, passcodes, and so on), and so on.

In some implementations, the bailment transport device 104 may transport the item over a distance. For example, the bailment transport device 104 may include a variety of transport mechanisms (such as one or more conveyor belts, conveyors, robotic arms, drones, shuttles, movement personnel, and so on) that are operable to route the item from an origin to a destination (such as between two points in a facility, between different cities or other places, and so on). However, in other examples, the bailment transport device 104 may control the item between acceptance and return of the item. For example, in some implementations, the bailment accepting device 101, bailment transport device 104, and bailment delivery device 105 may all be at a single facility where items may be checked for an amount of time and then returned. In various implementations, the bailment accepting device 101, bailment transport device 104, and bailment delivery device 105 may even be incorporated into a single device. For example, a mobile phone locker may take control of a person's cell phone, guard the mobile phone for a period of time, and then return the mobile phone to the person. Various configurations are possible and contemplated without departing from the scope of the present disclosure.

By way of illustration, the identification system 102 may be a biometric identification system. In various implementations, the bailment accepting device 101 and/or another device may include a biometric reader device (such as one or more fingerprint sensors, cameras, and/or other devices or components that are operable to capture information about a person) that actively or passively obtains one or more digital representations (such as one or more hashes, encrypted or unencrypted data structures, and so on) of one or more biometrics (such as one or more fingerprints, palm prints, facial images, iris images, retina images, gaits, and/or any other information regarding a person's body or portion thereof) from a person. The bailment accepting device 101 may transmit the digital representation of the biometric to the identification system 102. The identification system 102 may determine an identity of a person by comparing the digital representation of the biometric to stored biometric data. The identification system 102 may have previously stored the stored biometric data upon authenticating identities of people being enrolled in a biometric identification system. The identification system 102 may return information regarding the identity to the bailment accepting device 101. For example, the identification system 102 may return one or more identifiers (such as a name of the person, a social security number for the person, an account number for the person) that indicate the identity (and may or may not include the digital representation of the biometric), one or more attestations regarding the identity (whether or not the person is authorized to provide an item, whether or not the person has paid to provide the item, and so on), and so on. The bailment accepting device 101 may then associate the identity with the item (such as by attaching a trackable tag to the item, providing a trackable tag that the person may attach to the item, programming a trackable component of the item like a radiofrequency identification device or RFID, and so on).

Although this describes the bailment accepting device 101 obtaining the digital representation of the biometric and communicating with the identification system 102, it is understood that this is an example. Such actions may be performed by other devices (such as the bailment transport device 104 and/or the bailment delivery device 105) in other implementations without departing from the scope of the present disclosure.

The above provides a number of technological improvements over typical bailment systems. For example, use of the identification system 102 may separate information used for identification (such as stored biometrics) from devices, such as the bailment accepting device 101, that use identification. This may improve security for the stored identification information, allow support of multiple devices that use identification without replicating identification or data storage functions, and/or otherwise add functionality and/or reduce resource consumption. By way of another example, the technologically interconnected nature of the bailment system 100 may allow functions not otherwise possible, such as personally adjusted item delivery or routing based on changed circumstances. In short, the devices that make up the bailment system 100 may be capable of more functions more efficiently while using fewer resources than other bailment systems.

Figure 2:
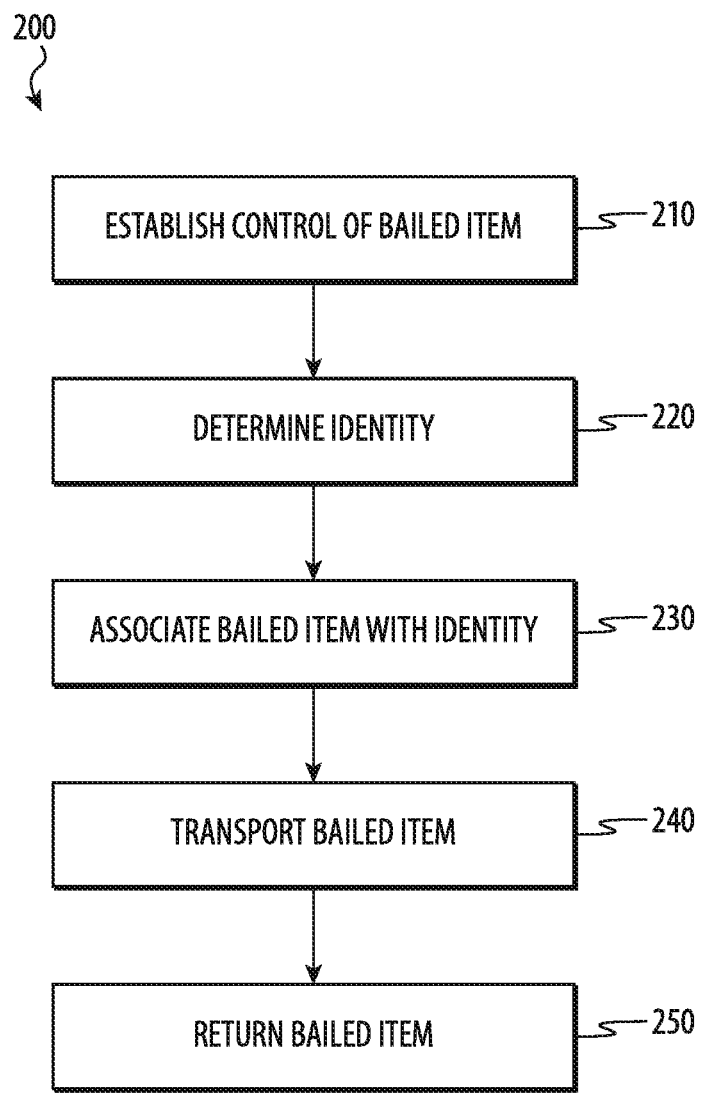
FIG. 2 depicts a flow chart illustrating a method for operating a bailment system. This method may be performed by the bailment system of FIG. 1.

FIG. 2 depicts a flow chart illustrating a method 200 for operating a bailment system. This method may be performed by the bailment system 100 of FIG. 1.

At 210, a bailment system (such as via a bailment accepting device) establishes control of a bailed item. For example, a bailment accepting device kiosk may include a closeable hatch and may establish control of a bailed item by closing the hatch after the bailed item is placed inside. By way of another example, a bailment accepting device kiosk may include a robotic clasp that closes around a portion of a bailed item (such as the handle of a bag) to establish control. In still another example, a bailment accepting device kiosk may include a bailed item placement area and monitoring devices (such as pressure sensors under the placement area, cameras that track movement in and/or out of the placement area, and so on) to establish control by determining that the bailed item is placed into the placement area and not thereafter removed. Various configurations are possible and contemplated without departing from the scope of the present disclosure.

At 220, the bailment system determines an identity. In some implementations, a bailment accepting device may communicate with an identification system to determine the identity. For example, a bailment accepting device may include one or more biometric reader devices that may obtain one or more digital representations of one or more biometrics (such as by imaging or scanning a fingerprint using an image sensor, a phosphorescence sensor, a capacitive sensor, and so on; by a camera capturing one or more images of a face, iris, retina, gait, and so on; or the like). In such an example, the digital representation of the biometric may be compared to biometric data stored in association with identity information to determine an identity associated with the digital representation of the biometric. In other examples, a person may provide authentication information associated with a social media or other account (or other aggregate data, such as a provided address and birth data or other combination of knowledge that a person associated with an identity would know) and it may be determined whether or not an identity can be reliably determined as being associated with the social media or other account. In some implementations of such examples, biometric or other verification may be performed to supplement an identity determination made using the social media or other account. Various configurations are possible and contemplated without departing from the scope of the present disclosure.

At 230, the bailment system associates the bailed item with the identity. For example, a bailment accepting device may attach a tag to the item and the tag may specify the identity (such as by including text, one or more machine readable codes like a matrix barcode, or more electronically readable elements such as an RFID component and so on). Tags may be attached by adhering the tag to the bailed item, clipping the tag to the bailed item, printing the tag on the bailed item, wrapping the tag around a portion of the bailed item and attaching the tag to itself (such as using adhesive, one or more clasps, and so on), and so on. By way of another example, a bailment accepting device may include a camera or other scanning device that is operable to uniquely identify a bailed item based on a captured picture or other scan and associated the identity with the picture or other scan that uniquely identifies the bailed item. Various configurations are possible and contemplated without departing from the scope of the present disclosure.

At 240, the bailment system (such as using one or more bailment transport devices) may transport the item. For example, bailment transport devices may include one or more robotic arms, conveyor belts, automated and/or non-automated vehicles, moving carousels, transport personnel, routing direction devices, and so on. Various configurations are possible and contemplated without departing from the scope of the present disclosure.

At 250, the bailment system returns the bailed item, such as using one or more bailment delivery devices. Such bailment delivery devices may include carousels where people may claim bailed items, automated and/or non-automated delivery vehicles, individual lockers storing bailed items that people may need to verify identity to open, and so on. Various configurations are possible and contemplated without departing from the scope of the present disclosure.

Although the example method 200 is illustrated and described as including particular operations performed in a particular order, it is understood that this is an example. In various implementations, various orders of the same, similar, and/or different operations may be performed without departing from the scope of the present disclosure.

For example, 240 illustrates and describes transporting the item. However, in some examples, the item may not be transported between acceptance and return. In such an example, transport may be omitted. Various configurations are possible and contemplated without departing from the scope of the present disclosure.

Further, the method 200 is illustrated and described as determining an identity and associating the bailed item with the identity. However, it is understood that this is an example. In other implementations, other approaches are possible without departing from the scope of the present disclosure. For example, in some implementations, a digital representation of a biometric may be obtained and associated with the bailed item without determining an identity and associating the identity with the bailed item. In such an example, a person may provide a digital representation of a biometric when claiming a bailed item and the digital representation of the biometric may be matched to the previously obtained digital representation of the biometric. In various implementations of such an example, routing information may be associated with the bailed item and/or the digital representation of the biometric to control routing of the bailed item during transport.

In various examples, this example method 200 may be implemented as a group of interrelated software modules or components that perform various functions discussed herein. These software modules or components may be executed by one or more computing devices, such as the bailment accepting device 101, the bailment transport device 104, the bailment delivery device 105, and/or the identification system 102 of FIG. 1.

Figure 3:
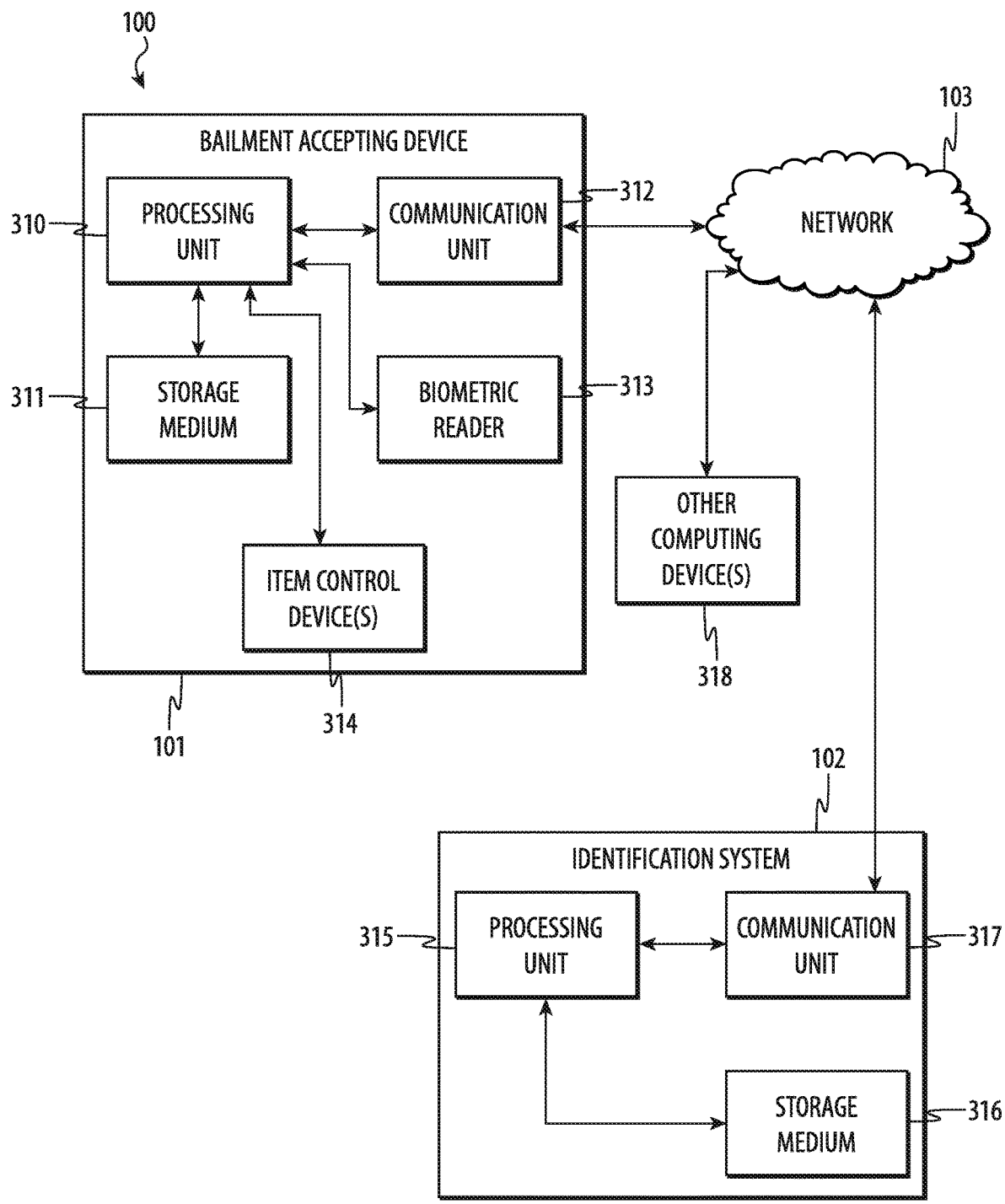
FIG. 3 depicts example components and functional relationships therebetween that may be used in an example implementation of the bailment system of FIG. 1.

FIG. 3 depicts example components and functional relationships therebetween that may be used in an example implementation of the bailment system 100 of FIG. 1.

The bailment accepting device 101 may include one or more processing units 310 or other processors or controllers, one or more non-transitory storage media 311 (which may take the form of, but is not limited to, a magnetic storage medium; optical storage medium; magneto-optical storage medium; read only memory; random access memory; erasable programmable memory; flash memory; and so on), one or more communication units 312, one or more biometric readers 313 or other biometric reader devices (and/or monitoring components operable to monitor a person providing an item for bailment), one or more item control devices 314, and/or one or more other components (such as components operable to inspect various aspects regarding the item like whether or not the dimensions or weight of the item meet requirements, whether or not the item includes hazardous contents, and so on). The processing unit 310 may execute one or more instructions stored in the storage medium 311 to perform various bailment accepting device 101 functions, such as accepting control of an item, communicating with the identification system 102 via the communication unit 312, determining an identity, associating an item with the identity, and so on.

Similarly, the identification system 102 may include one or more processing units 315 or processors or other controllers, storage media 316, communication units 317, and so on. The processing unit 315 may execute one or more instructions stored in the storage medium 316 to perform various identification system 102 functions. For example, the processing unit 315 may receive one or more digital representations of biometrics via the communication unit 317, determine one or more identities by comparing the received digital representations of biometrics to stored biometric data, determine one or more identifiers associated with the determined identities, provide information regarding the determined identities (such as by providing the identifiers, attestations regarding the identities, and so on) via the communication unit 317, and so on.

As illustrated, the bailment system 100 may also include one or more other computing devices 318 that may be operable to communicate with the bailment accepting device 101, the identification system 102, and/or other devices via the communication network 103. For example, such other computing devices 318 may include one or more governmental and/or other databases, payment processing systems, computing devices belonging to the person who bailed the item in order to provide notifications and/or receive instructions regarding the item, devices that are operable to provide information regarding whether or not bailment is authorized and/or under what conditions, devices operable to provide status updates regarding the person (such as whether or not the person passes through a security checkpoint, boards a vehicle such as a plane, and so on), and so on.

Figure 4A:
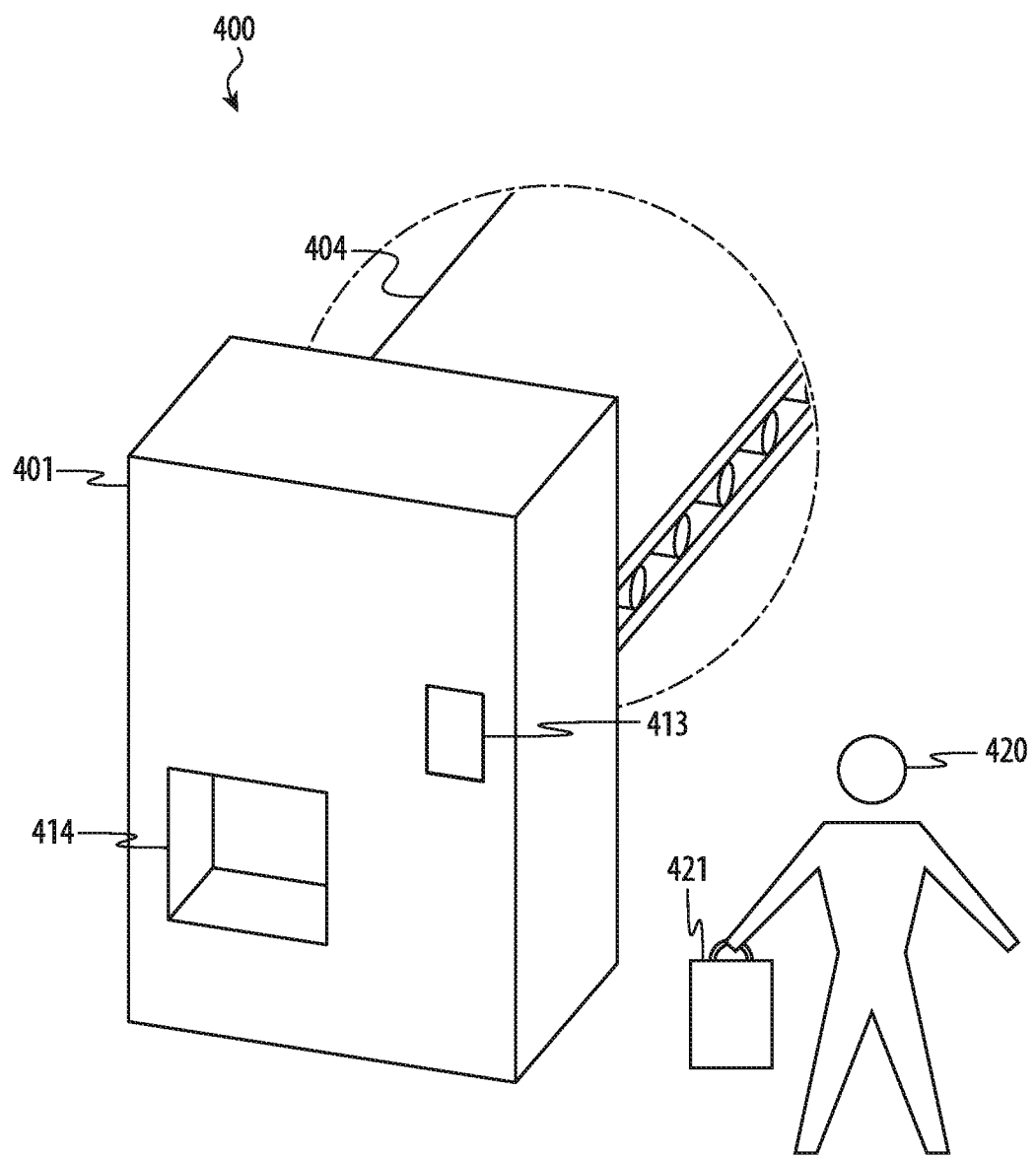
FIG. 4A depicts a portion of a first example of a biometric bag check system.

FIG. 4A depicts a portion of a first example of a biometric bag check system 400. The biometric bag check system 400 may be the bailment system 100 of FIGS. 1 and/or 3. The biometric bag check system 400 may include a bag accepting device 401 that is operable to obtain control of a bag 421 from a person 420. For example, the bag accepting device 401 may be a vending machine, kiosk, or other automated device that is operable to obtain control of the bag 421.

The bag accepting device 401 may include one or more bag control mechanisms. For example, as illustrated, the bag accepting device 401 may include a closeable aperture 414 into which the bag 421 may be inserted. The bag accepting device 401 may also include one or more identification mechanisms, such as one or more biometric reader devices 413, one or more monitoring mechanisms that monitor the person 420 during acceptance of the bag and/or identification, and so on.

The bag acceptance device 401 may also be operably connected to one or more bag transport devices 404. For example, the bag transport device 404 may be a conveyor belt connected to a back of the bag acceptance device 401 and otherwise blocked off by a wall. The bag acceptance device 401 may be operable to receive control of the bag 421 through the closeable aperture 414 and then route the bag 421 by providing the bag 421 through the back of the bag acceptance device 401 to the conveyor belt of the bag transport device 404 (and/or otherwise allowing the bag transport device 404 to remove the bag 421 from the bag accepting device 401).

Figure 4B:
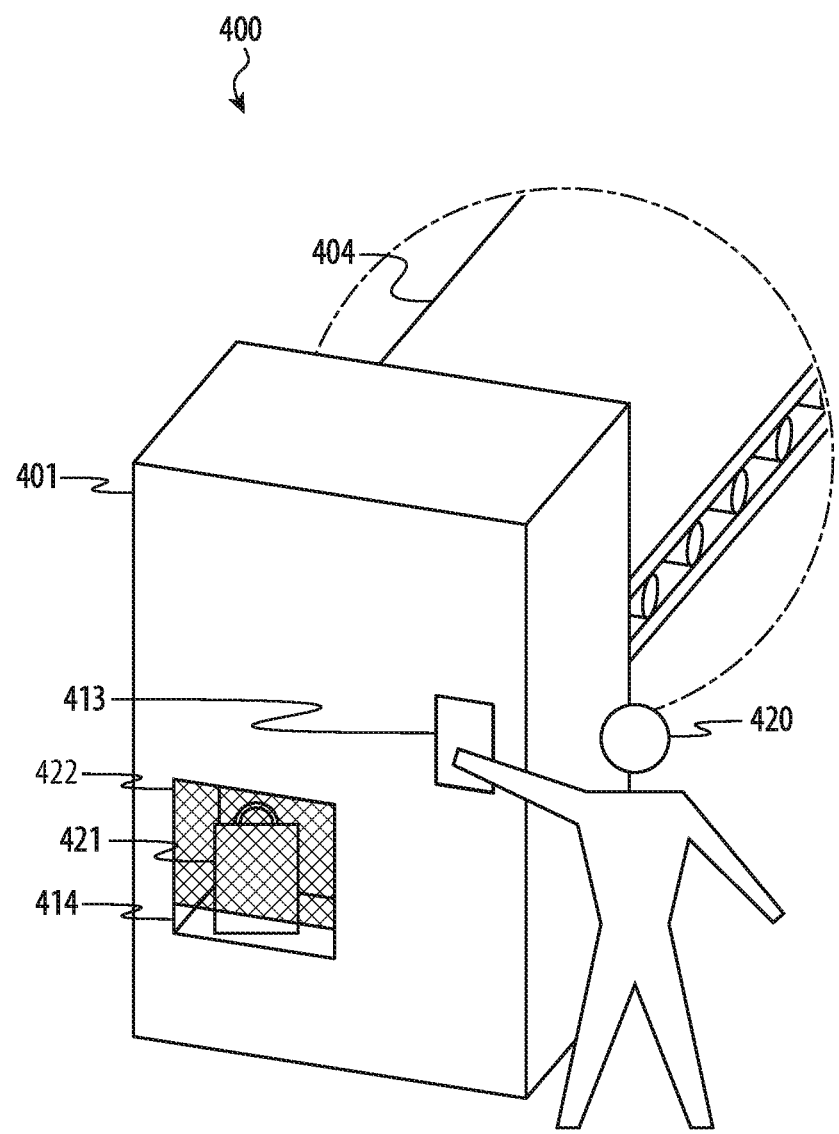
FIG. 4B depicts the biometric bag check system of FIG. 4A after the person places the bag in the bag accepting device.

FIG. 4B depicts the biometric bag check system 400 of FIG. 4A after the person 420 places the bag 421 in the bag accepting device 401. The bag accepting device 401 closes a hatch 422 to close the closeable aperture 414. This allows the bag accepting device 401 to have control of the bag 421 and the person 420 to no longer have access to the bag 421. The bag accepting device 401 may then be operable to receive a digital representation of a biometric from the person 420 once control of the bag 421 is established. For example, as shown, the biometric reader device 413 may be a fingerprint sensor operable to capture one or more fingerprints of the person 420.

The bag accepting device 401 may determine and/or receive an identity of the person 420 using the digital representation of the biometric. For example, the bag accepting device 401 may transmit an image of a fingerprint to a biometric identification system. The bag accepting device 401 may receive a response from the identification system indicating an identity of the person, such as an identifier for the person. The bag accepting device 401 may use the identity in some examples to verify that the person 420 is authorized to check the bag 421, such as by communicating the identifier to an airline or other system. For example, the bag accepting device 401 may verify that the person has paid to check a bag for a flight or that a bag check has been paid for another person whom the person is authorized to check bags for (such as a parent who may be authorized to check bags for a child's flight). The bag accepting device 401 may receive a response indicating whether or not the person 420 has a flight that day, whether or not the person 420 is allowed to check the bag 421, the terms under which the person 420 is allowed to check the bag 421 (such as only one bag without additional payment, no bag over 45 pounds without additional payment, acceptable bag dimensions, and so on), and so on.

Figure 4C:
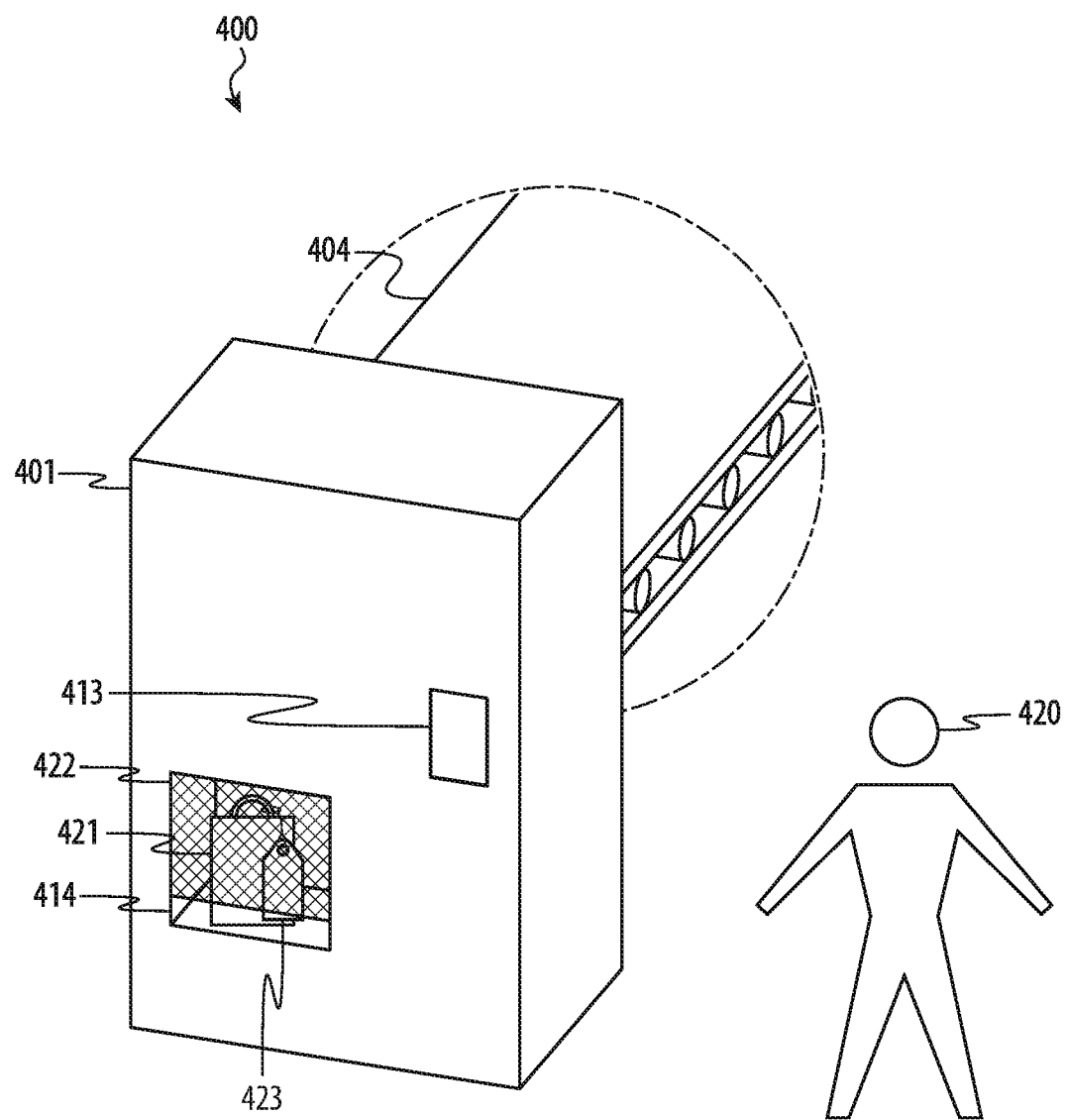
FIG. 4C depicts the biometric bag check system of FIG. 4B after the bag accepting device tags the bag.

The bag accepting device 401 may then associate the bag 421 with the identity. For example, FIG. 4C depicts the biometric bag check system 400 of FIG. 4B after the bag accepting device 401 tags the bag 421 with a tag 423. The bag accepting device 401 may include attachment mechanisms for attaching the tag 423 once the bag accepting device 401 has control of the bag 421.

The biometric bag check system 400 may use the tag 423 and/or identity to track the bag 421 throughout the biometric bag check system 400. For example, various components of the biometric bag check system 400 (such as the bag accepting device 401, the bag transport device 404, a bag delivery device, and so on) may include components operable to read information from the tag 423. In this way, the bag accepting device 401 of the biometric bag check system 400 may use the tag 423 and/or the identity to monitor the location of the bag 421 (and/or perform various actions regarding the bag 421, such as interrupting routing or transport of the bag 421, rerouting the bag 421, transmitting notifications when the bag 421 reaches various points, and so on) throughout the biometric bag check system 400.

In other examples, the bag accepting device 401 may provide the tag 423 for the person 420 to attach. In various examples, the bag accepting device 401 may include monitoring mechanisms, such as one or more cameras, for ensuring that the person 420 attaches the tag 423 to the correct bag 421, that another person does not provide the bag 421, and/or various other unauthorized actions.

Figure 4D:
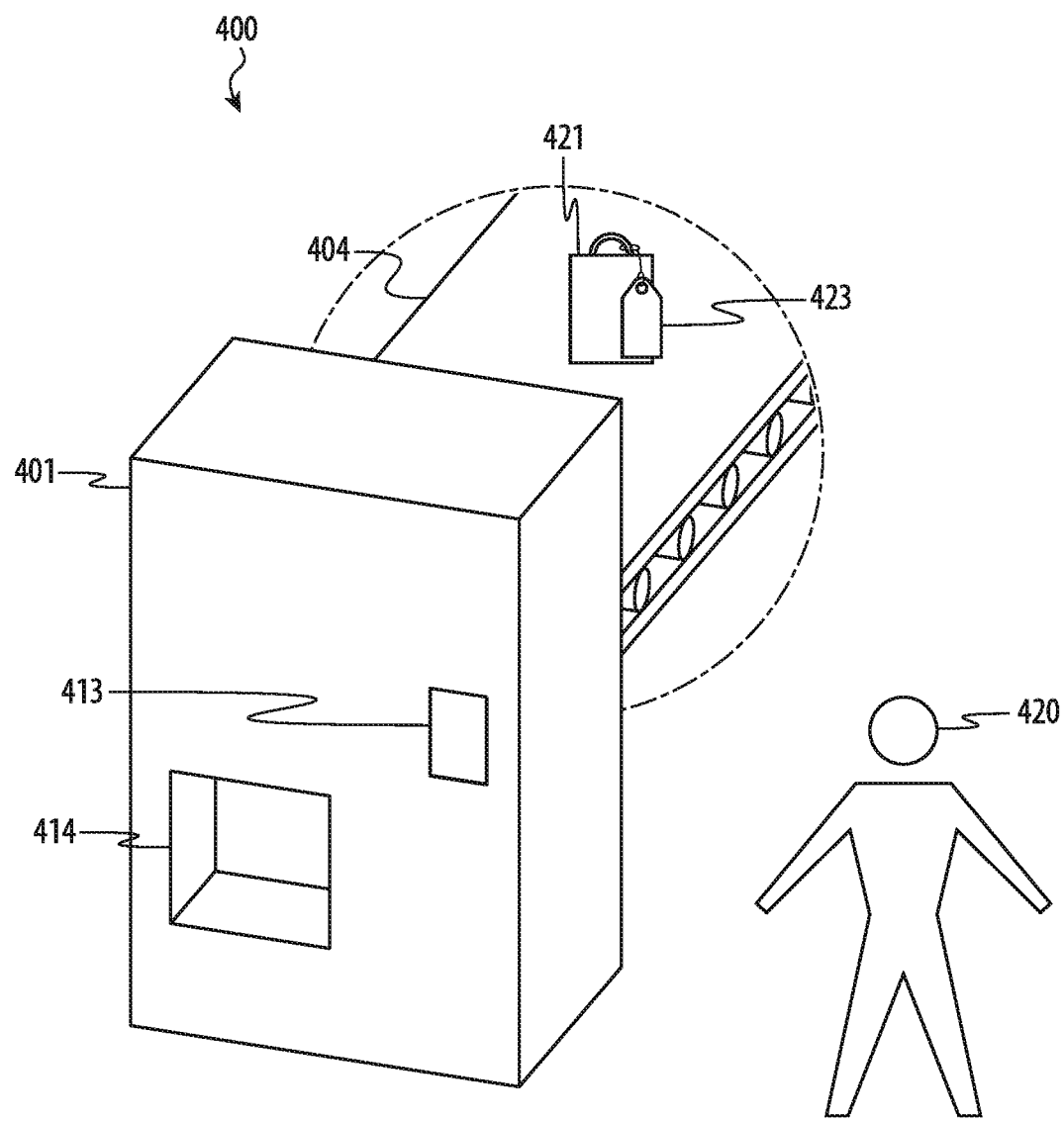
FIG. 4D depicts the biometric bag check system of FIG. 4C after the bag accepting device provides the bag to the bag transport device.

After associating the bag 421 with the identity, the bag accepting device 401 may route the bag 421. The bag 421 may be routed and/or transported according to the identity, such as in accordance with loading on a flight for which the person is scheduled. For example, FIG. 4D depicts the biometric bag check system 400 of FIG. 4C after the bag accepting device 401 provides the bag 421 to the bag transport device 404. The biometric bag check system 400 may then route and/or transport the bag 421 accordingly until delivering and/or otherwise returning the bag 421 to the person 420.

Figure 4E:
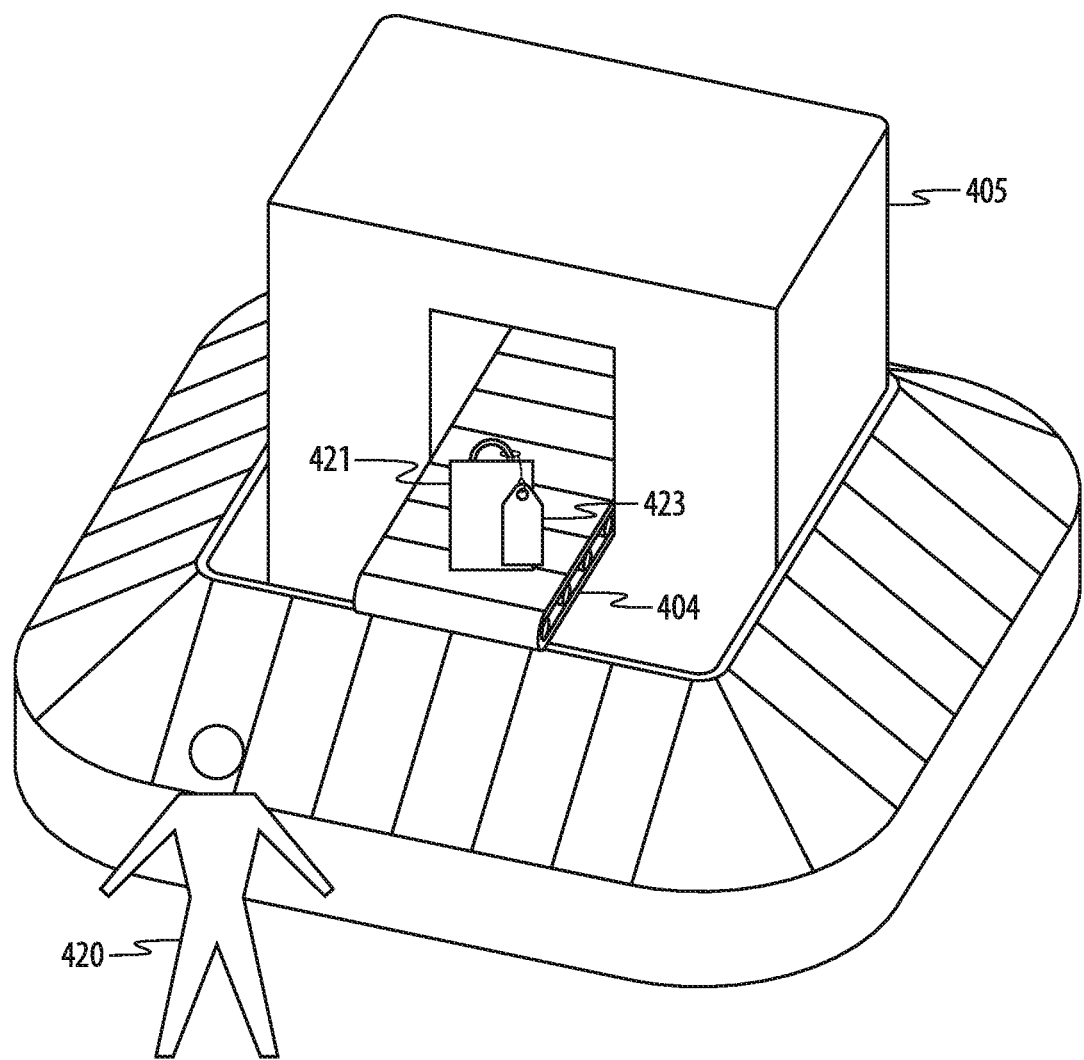
FIG. 4E depicts a bag delivery device portion of the biometric bag check system of FIG. 4D delivering the bag to the person.

For example, FIG. 4E depicts a bag delivery device 405 portion of the biometric bag check system 400 of FIG. 4D delivering the bag 421 to the person 420. In this example, the bag delivery device 405 is a baggage carousel. A conveyor of the bag transport device 404 may provide the bag 421 (which may have the tag 423 still attached) to the carousel of the bag delivery device 405. The person may pick up the bag 421 from the carousel.

In some implementations, the biometric bag check system 400 may use the identification system and/or other identification mechanisms to only allow the person 420 or an authorized representative to claim the bag 421. For example, the person 420 may only be allowed into a baggage retrieval area (and/or access to a secured locker or other secured mechanism) upon providing a biometric, passcode, and so on.

In some examples, one or more devices of the biometric bag check system 400 may communicate with one or more other devices as part of routing and/or transporting the bag 421. For example, the bag delivery device 405 and/or another component of the biometric bag check system 400 may transmit a message to a computing device associated with the identity informing the person 420 when the bag 421 is at the carousel or other location where the bag 421 can be claimed, and so on.

By way of another example, the biometric bag check system 400 may communicate with one or more devices with regards to whether or not the person passes a security checkpoint and/or boards a flight. For example, the identification system may be used to identify the person 420 at the security checkpoint and/or during boarding and may thus be aware when these actions are associated with the identity. If the biometric bag check system 400 does not receive an indication that the person passes the security checkpoint and/or boards a flight as expected, the biometric bag check system 400 may determine whether to alter transport of the bag 421. Altering transport may include halting routing and/or transport of the bag 421 and/or rerouting the bag 421 so that the bag 421 is not loaded onto a plane without the person 420 and/or transported to where the person 420 is not. This may prevent unnecessary transport of the bag 421 if the person misses a flight, may enhance security by preventing the person 420 from loading the bag 421 on a flight the person 420 does not intend to take, and/or provide other benefits.

In some examples, the biometric bag check system 400 may determine to perform additional security screening on the bag 421 if the person 420 misses a flight. Additional security screening may involve additional inspection, pulling the bag 421 from the flight, leaving the bag 421 on the flight, delaying the flight in order to be able to perform actions related to the bag 421, and/or a variety of other actions. In various implementations, the biometric bag check system 400 may make a determination whether to perform additional security screening and/or what additional security screening to perform upon determination that the person 420 missed a flight and/or other circumstances. Such a determination may be based upon information known about the person 420 by the identification system (such as risk factors associated with the person, whether or not the person is likely to take another flight to a same destination as the first flight within a short time person, and so on), security factors associated with the flight and/or other people associated with the flight, weather conditions, flight schedules, and so on. For example, if the person 420 is a lower risk and the bag 421 is already on board, the bag 421 may not be pulled and may be rerouted upon arrival. However, if the person 420 is a higher risk, the bag 421 may be pulled. Various configurations are possible and contemplated without departing from the scope of the present disclosure.

The biometric bag check system 400 may also communicate with one or more computing devices associated with identity to provide various offers. For example, the biometric bag check system 400 may upsell delivery of the bag 421 directly to the person, may upsell delivery of the bag 421 to a secured area instead of an unsecured area, may upsell expedited bag 421 delivery, may upsell baggage insurance, may provide offers for discounted or free airport services (such as a restaurant or lounge) associated with a rewards account, and so on. The person 420 may be able to respond to pay for such communications, upsells, or offers via the computing device. For example, the biometric bag check system 400 may receive a response and use the identification system to process payment for a response using payment details (such as a credit card) associated with the identity, using a payment processing system via details associated with the identity (such as creating a credit account using biographic details associated with the identity), and so on.

In various examples, the person 420 may be associated with a high status account, a loyalty rewards account, or other such account. The account may accord the person 420 a "frictionless" experience. The account may accord the person 420 such an experience by recording default specifications for the person 420 so that the person 420 is not bothered by prompts to make choices and/or may indicate not to transmit any upsells to the person 420.

Figure 5:
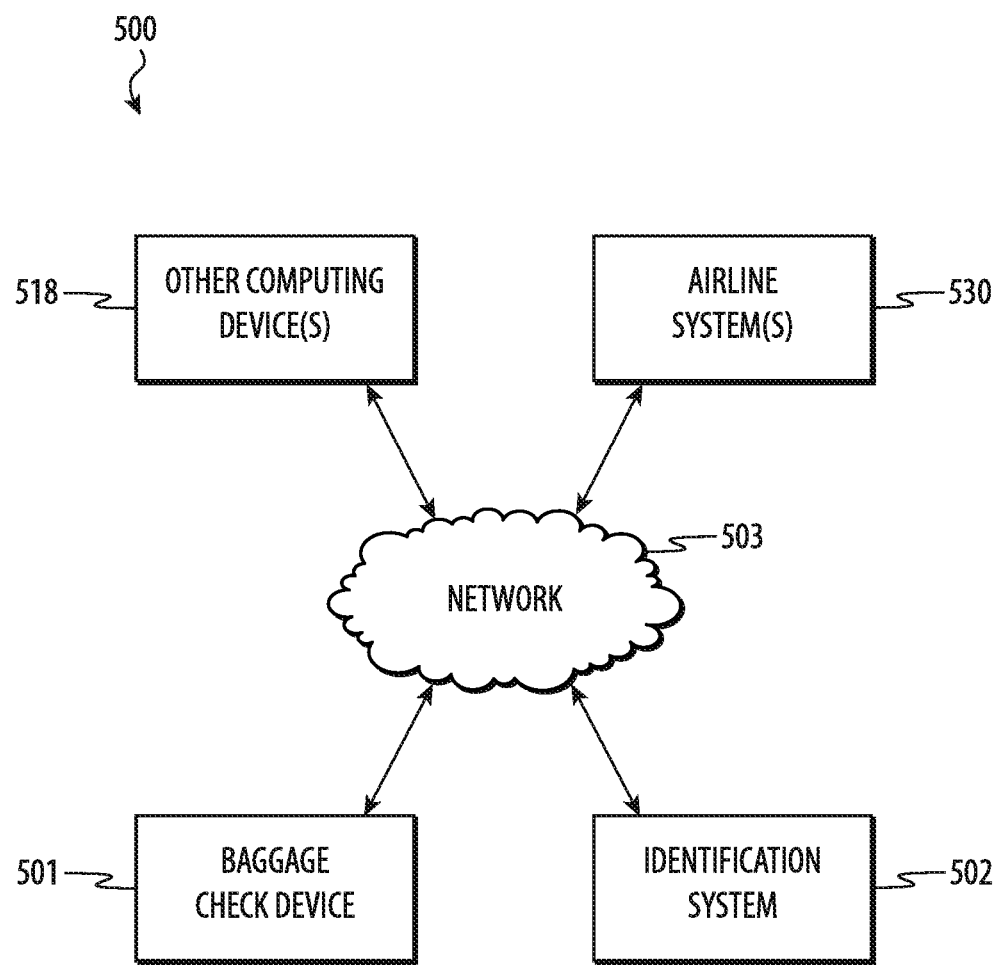
FIG. 5 depicts example communications between devices in an example biometric bag check system. The biometric bag check system may be the biometric bag check system of FIGS. 4A-4E.

FIG. 5 depicts example communications between devices in an example biometric bag check system 500. The biometric bag check system 500 may be the biometric bag check system 400 of FIGS. 4A-4E and/or the bailment system 100 of FIG. 1. As shown, a baggage check device 501 may communicate with one or more identification systems 502, one or more airline systems 530, and/or other computing devices 518 via one or more communication networks 503. The baggage check device 501 may be one or more components of the biometric bag check system 400 of FIGS. 4A-4E and/or the bailment system 100 of FIG. 1, such as the bag accepting device 401 and so on.

In various implementations, a biometric bag check system may include a bag accepting device operable to obtain control of a bag from a person, obtain a digital representation of a biometric from the person, use a biometric identification system to determine an identity for the person using the digital representation of the biometric, verify flight information for the person by communicating with an airline system using the identity, and route the bag upon verification of the flight information. The biometric bag check system may also include a bag transport device operable to receive the bag from the bag accepting device and transport the bag. The biometric bag check system may further include a bag delivery device operable to receive the bag from the bag transport device and deliver the bag to the person.

In some examples, the biometric bag check system may use the identity to determine whether the person passed a security checkpoint and interrupt transport of the bag if the person did not pass the security checkpoint. In numerous examples, the biometric bag check system may use the identity to determine whether the person boarded a flight associated with the flight information and interrupt transport of the bag if the person did not board the flight. In various examples, the biometric bag check system may determine whether to screen the bag based on the identity.

In numerous examples, the bag accepting device may tag the bag to associate the bag with the identity. In other examples, the bag accepting device may provide a tag that associates the bag with the identity. In some implementations of such examples, the bag accepting device may monitor while the person attaches the tag to the bag. In some examples of such implementations, the bag accepting device may interrupt routing of the bag if the bag accepting device is unable to monitor the person attaching the tag to the bag.

In various examples, the biometric bag check system may use the identity to transmit a notification that the bag is ready for delivery from the bag delivery device. In some such examples, the notification may include instructions to enable delivery.

In numerous examples, the bag accepting device may verify that control of the bag is obtained from a same person who provides the digital representation of the biometric prior to routing the bag. In some examples, the person may be a first person, the flight information may authorize routing of the bag for a second person, and the bag accepting device may verify that the flight information authorizes the first person to check the bag for the second person prior to routing the bag.

In some embodiments, a bag accepting device may include at least one non-transitory medium that stores instructions, a biometric reader device, and at least one processor communicably coupled to the biometric reader device. The at least one processor may execute the instructions to obtain control of a bag from a person, obtain an identity for the person using a digital representation of a biometric obtained via the biometric reader device, communicate with an airline system to verify flight information for the person using the identity, and route the bag using a biometric bag check system upon verification of the flight information.

In various examples, the bag accepting device may obtain the identity from a biometric identification system. In some examples, the bag accepting device may obtain the identity from a biometric identification system in response to transmitting the digital representation of the biometric to the biometric identification system. In numerous examples, the bag accepting device may prevent the person from accessing the bag prior to routing after obtaining control.

In numerous embodiments, a bag delivery device may include at least one non-transitory medium that stores instructions and at least one processor. The at least one processor may execute the instructions to receive a bag routed via a biometric bag check system wherein the biometric bag check system associated the bag with an identity of a person determined using a received biometric, transmit a notification regarding possession of the bag using the identity, and provide the bag to the person.

In some examples, the bag delivery device may further include a biometric reader device and the at least one processor may receive a digital representation of a biometric from the person using the biometric reader device, use the digital representation of the biometric to verify the identity of the person with a biometric identification system, and provide the bag upon verification of the identity. In various examples, the bag delivery device may further include a locker and the at least one processor may provide the bag by opening the locker. In numerous examples, the notification may specify a location of the bag.

Figure 6:
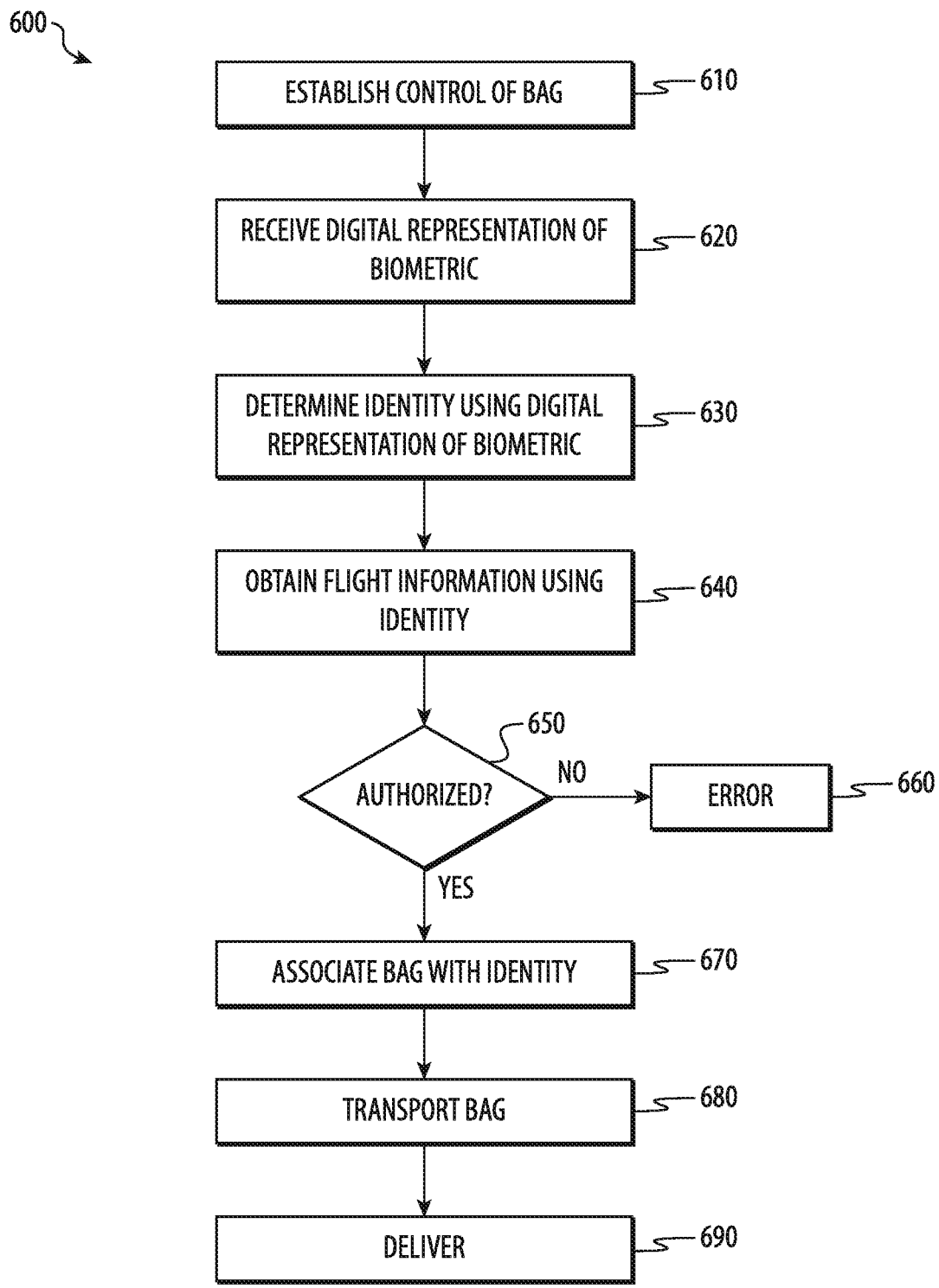
FIG. 6 depicts a flow chart illustrating a first example method for operating a biometric bag check system. The biometric bag check system may be the biometric bag check systems of FIGS. 4A-4E or FIG. 5.

FIG. 6 depicts a flow chart illustrating a first example method 600 for operating a biometric bag check system. The biometric bag check system may be the biometric bag check systems 400, 500 of FIGS. 4A-4E or FIG. 5.

At 610, a biometric bag check system may establish control of a bag. At 620, the biometric bag check system may receive a digital representation of a biometric. At 630, the biometric bag check system may determine an identity using the digital representation of the biometric. At 640, the biometric bag check system may obtain flight information using the identity.

The flow may then proceed to 650 where the biometric bag check system determines whether or not checking of the bag is authorized. For example, if the identity is associated with a flight that day at an airport corresponding to the location where the bag is provided, the biometric bag check system may determine checking is authorized. By way of another example, the biometric bag check system may determine the checking is not authorized if the identity is associated with a list of people banned from flying, such as a federal no fly list. If checking is not authorized, the flow proceeds to 660 where checking may be rejected. Otherwise, the flow may proceed to 670.

At 670, the biometric bag check system may associate the bag with the identity. The flow may then proceed to 680 where the biometric bag check system may transport the bag. Next, at 690, the biometric bag check system may deliver the bag.

Although the example method 600 is illustrated and described as including particular operations performed in a particular order, it is understood that this is an example. In various implementations, various orders of the same, similar, and/or different operations may be performed without departing from the scope of the present disclosure.

For example, the method 600 uses the term "bag." However, in various examples, the biometric bag check system may check, transport, and/or deliver any kind of bag, baggage, suitcase, garment bag, and/or any other item. The biometric bag check system may not be restricted to checking "bags."

Further, the method 600 is illustrated and described as determining an identity and associating the bag with the identity. However, it is understood that this is an example. In other implementations, other approaches are possible without departing from the scope of the present disclosure. For example, in some implementations, the bag may be directly associated with the digital representation of the biometric without determining an identity and associating the identity with the bag. In such an example, a person may provide a digital representation of a biometric when claiming a bag and the digital representation of the biometric may be matched to the previously obtained digital representation of the biometric. In various implementations of such an example, routing information may be associated with the bag and/or the digital representation of the biometric to control routing of the bag during transport.

In various examples, this example method 600 may be implemented as a group of interrelated software modules or components that perform various functions discussed herein. These software modules or components may be executed by one or more computing devices, such as the bag accepting device 401, the bag transport device 404, and/or the bag delivery device 405 of FIG. 4 and/or the baggage check device 501 of FIG. 5.

Figure 7:
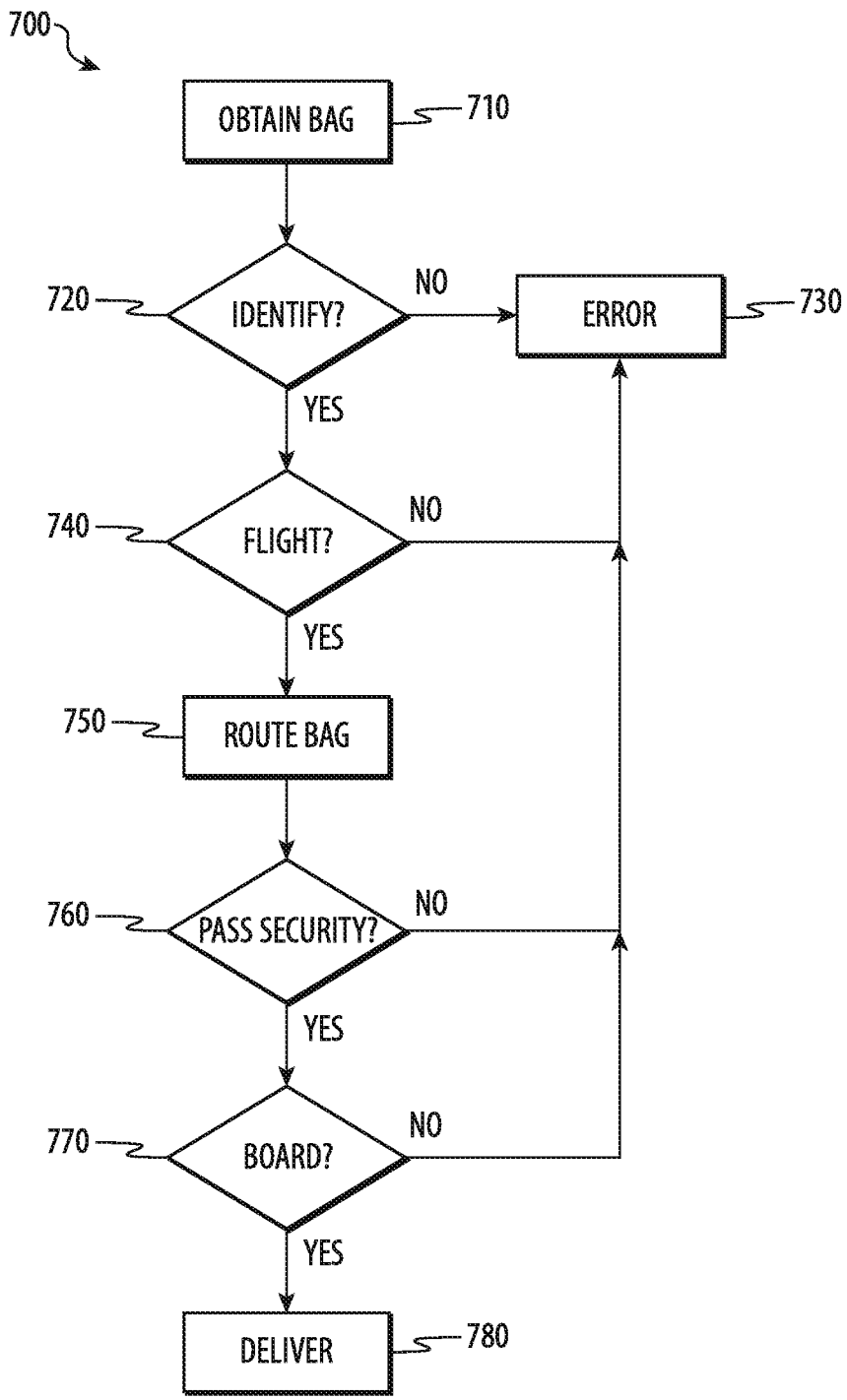
FIG. 7 depicts a flow chart illustrating a second example method for operating a biometric bag check system. The biometric bag check system may be the biometric bag check systems of FIGS. 4A-4E or FIG. 5.

FIG. 7 depicts a flow chart illustrating a second example method 700 for operating a biometric bag check system. The biometric bag check system may be the biometric bag check systems 400, 500 of FIGS. 4A-4E or FIG. 5.

At 710, the biometric bag check system may obtain a bag. At 720, the biometric bag check system may determine whether or not an identity can be determined to associate with the bag. The identity may be determined using a digital representation of a biometric. If not, the flow proceeds to 730 where the biometric bag check system determines that an error has occurred and may refuse to check the bag. Otherwise, the flow may proceed to 740.

At 740, the biometric bag check system may determine whether or not flight information can be associated with the identity. If not, the flow proceeds to 730 where the biometric bag check system determines an error has occurred and may refuse to check the bag. Otherwise, the flow may proceed to 750.

In various implementations, the biometric bag check system may determine that flight information can be associated with the identity, but that a flight associated with the flight information has been cancelled, rerouted, delayed due to weather, or otherwise changed. In such a situation, the biometric bag check system may refuse to check the bag to prevent bags that cannot be routed from being accepted into the biometric bag check system. Alternatively, the biometric bag check system may provide information regarding the flight status change, check the bag but route the bag differently due to the flight status change, hold the bag before rerouting to accommodate delays, and/or perform a variety of different actions in response to detecting the flight status change.

At 750, the biometric bag check system may route the bag associated with the identity. Routing may involve a bag accepting device moving to a bag transport device, a bag accepting device securing the bag until the bag is obtained from the bag accepting device by a bag transport device, and so on. The flow may then proceed to 760 where the biometric bag check system determines whether or not information can be obtained that the person passes security. If not, the flow may proceed to 730 where the biometric bag check system may determine that an error has occurred and to interrupt routing of the bag. Otherwise, the flow may proceed to 770.

At 770, the biometric bag check system may determine whether or not information can be obtained that the person boards the flight associated with the flight information. If not, the flow may proceed to 730 where the biometric bag check system may determine that an error has occurred and to interrupt routing of the bag. Otherwise, the flow may proceed to 780 where the biometric bag check system may deliver the bag. For example, delivery of the bag may include transporting the bag to a baggage delivery carousel.

Although the example method 700 is illustrated and described as including particular operations performed in a particular order, it is understood that this is an example. In various implementations, various orders of the same, similar, and/or different operations may be performed without departing from the scope of the present disclosure.

For example, the method 700 is illustrated and described as routing the bag if flight information can be obtained. However, in some examples, payment for the bag may first be obtained. For example, a bag drop kiosk may include a credit card reader and routing may be performed after the credit card reader is used to obtain payment. In other examples, an identification system may be used to process payment for the bag using payment details associated with the identity. Various configurations are possible and contemplated without departing from the scope of the present disclosure.

In various examples, this example method 700 may be implemented as a group of interrelated software modules or components that perform various functions discussed herein. These software modules or components may be executed by one or more computing devices, such as the bag accepting device 401, the bag transport device 404, and/or the bag delivery device 405 of FIG. 4 and/or the baggage check device 501 of FIG. 5.

Figure 8:
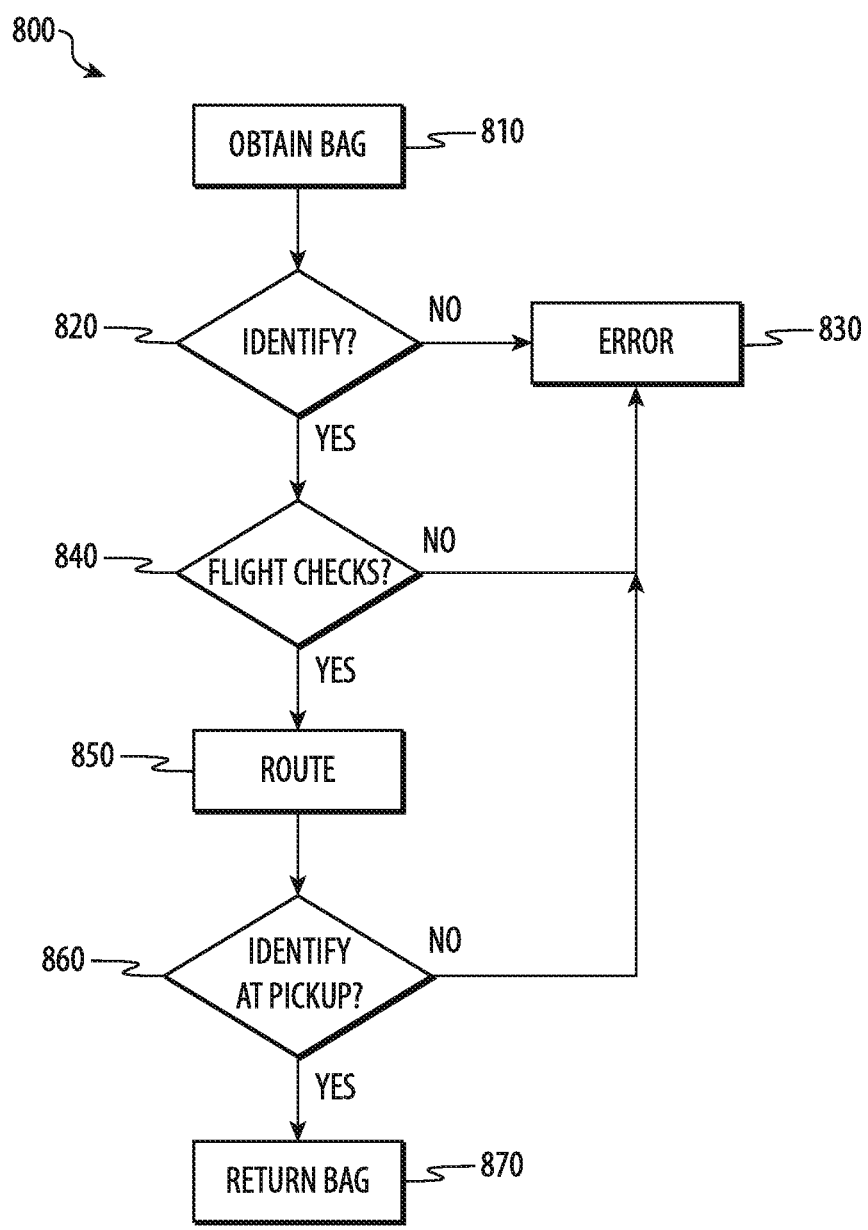
FIG. 8 depicts a flow chart illustrating a third example method for operating a biometric bag check system. The biometric bag check system may be the biometric bag check systems of FIGS. 4A-4E or FIG. 5.

FIG. 8 depicts a flow chart illustrating a third example method 800 for operating a biometric bag check system. The biometric bag check system may be the biometric bag check systems 400, 500 of FIGS. 4A-4E or FIG. 5.

At 810, a biometric bag check system may obtain a bag. The flow may proceed to 820 where the biometric bag check system may determine whether or not an identity can be associated with the bag. The identity may be determined using a digital representation of a biometric. If not, the flow may proceed to 830 where the biometric bag check system may determine that an error has occurred and may refuse to route the bag. Otherwise, the flow may proceed to 840.

At 840, the biometric bag check system may determine whether or not one or more flight checks can be completed. Flight checks may include verifying whether or not a flight within a time period (such as 4 hours, 5 hours, 8 hours, 12 hours, 2 days, and so on) out of an airport corresponding to a current location is associated with the identity, whether or not bag check payment is associated with the identity, whether or not any flight restrictions are associated with the identity, whether or not the flight associated with the identity has been delayed or cancelled, whether or not the flight has been rerouted, and/or any other flight checks. If the flight checks cannot be completed, the flow may proceed to 830 where the biometric bag check system may determine that an error has occurred and may refuse to route the bag. Otherwise, the flow may proceed to 850.

In some examples, the biometric bag check system may direct a person to assistance and/or summon assistance for the person if one or more flight checks cannot be completed. The biometric bag check system may also direct the person to assistance and/or summon assistance upon the occurrence of issues with other operations as well, such as failure to associate an identity with the bag and so on.

At 850, the biometric bag check system may route the bag. Routing may involve a bag accepting device moving to a bag transport device, a bag accepting device securing the bag until the bag is obtained from the bag accepting device by a bag transport device, and so on. The flow may then proceed to 860 where the biometric bag check system determines whether or not identity can be determined at pickup. For example, a person may provide a digital representation of a biometric and/or passcode or other identification associated with the identity to obtain access to a baggage carousel or open a baggage locker. If so, the flow may proceed to 870 and the biometric bag check system may return the bag. Otherwise, the flow may proceed to 830 where the biometric bag check system determines an error has occurred and not deliver the bag.

Although the example method 800 is illustrated and described as including particular operations performed in a particular order, it is understood that this is an example. In various implementations, various orders of the same, similar, and/or different operations may be performed without departing from the scope of the present disclosure.

For example, the method 800 is illustrated and described as proceeding from 860 to 830 and determining an error occurred if identity cannot be determined at pickup. However, in some implementations, the biometric bag check system may continue to hold the bag at 860 until identity can be determined. Various configurations are possible and contemplated without departing from the scope of the present disclosure.

In various examples, this example method 800 may be implemented as a group of interrelated software modules or components that perform various functions discussed herein. These software modules or components may be executed by one or more computing devices, such as the bag accepting device 401, the bag transport device 404, and/or the bag delivery device 405 of FIG. 4 and/or the baggage check device 501 of FIG. 5.

Figure 9:
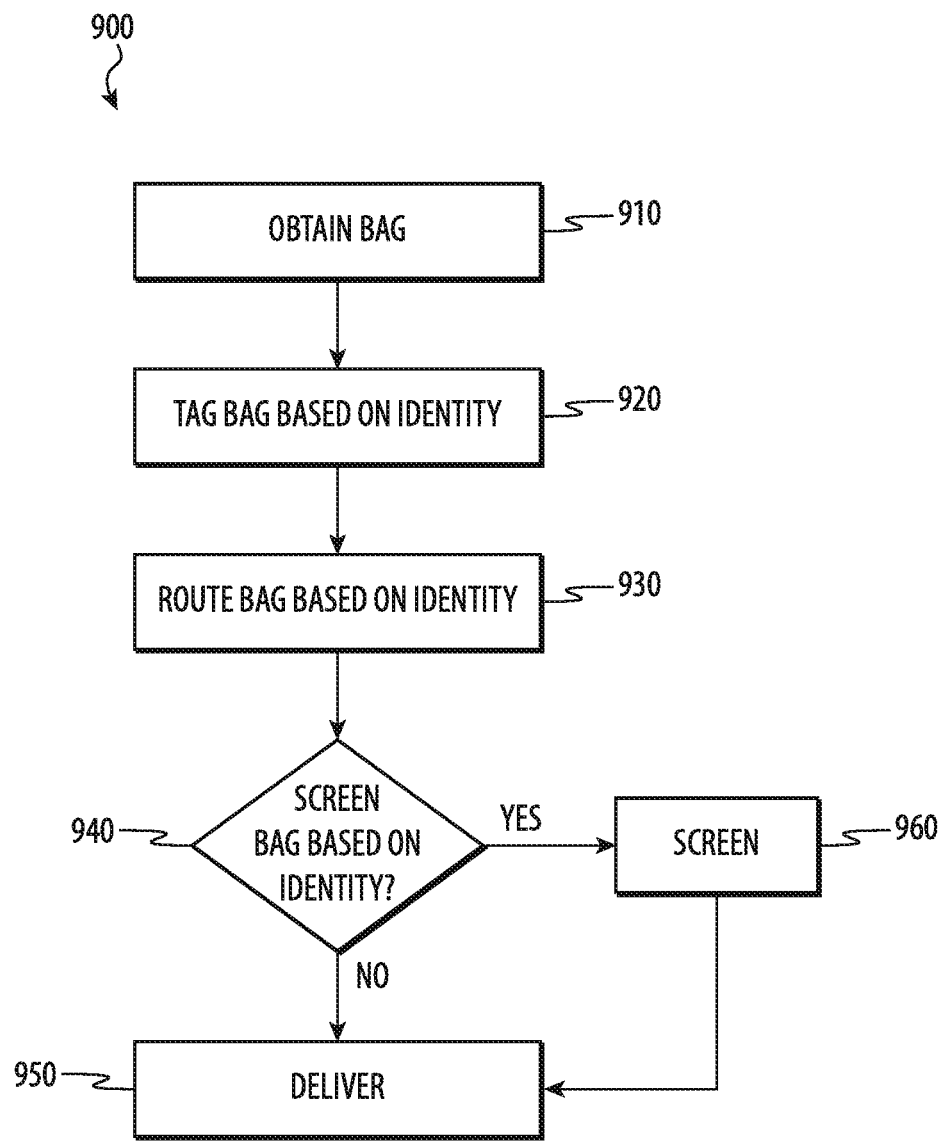
FIG. 9 depicts a flow chart illustrating a fourth example method for operating a biometric bag check system. The biometric bag check system may be the biometric bag check systems of FIGS. 4A-4E or FIG. 5.

FIG. 9 depicts a flow chart illustrating a fourth example method 900 for operating a biometric bag check system. The biometric bag check system may be the biometric bag check systems 400, 500 of FIGS. 4A-4E or FIG. 5.

At 910, a biometric bag check system may obtain a bag. At 920, the biometric bag check system may tag the bag based on a determined identity. At 930, the biometric bag check system may route the bag based on the identity. Routing may involve a bag accepting device moving to a bag transport device, a bag accepting device securing the bag until the bag is obtained from the bag accepting device by a bag transport device, and so on.

At 940, the biometric bag check system may determine whether or not the bag should be screened based on the identity. For example, the biometric bag check system may receive an indication that certain people have been selected for random bag screening. If the identity matches a name on such a list, the biometric bag check system may determine that the bag should be screened. By way of another example, the biometric bag check system may determine that the identity is associated with a high risk category. As such, the biometric bag check system may determine that the bag should be screened. In still another example, the biometric bag check system may determine that the identity is associated with an expedited security account and may determine that the bag should not be screened.

If the biometric bag check system determines not to screen the bag, the flow may proceed to 950 where the biometric bag check system routes the bag to delivery. Otherwise, the flow proceeds to 960 where the biometric bag check system routes the bag to screening before the flow proceeds to 950 and the biometric bag check system routes the bag for delivery.

Although the example method 900 is illustrated and described as including particular operations performed in a particular order, it is understood that this is an example. In various implementations, various orders of the same, similar, and/or different operations may be performed without departing from the scope of the present disclosure.

For example, 920 illustrates and describes the biometric bag check system tagging the bag based on the identity. However, in various examples, the biometric bag check system may monitor the person who is checking the bag tagging the bag rather than the biometric bag check system tagging the bag itself. Various configurations are possible and contemplated without departing from the scope of the present disclosure.

In various examples, this example method 900 may be implemented as a group of interrelated software modules or components that perform various functions discussed herein. These software modules or components may be executed by one or more computing devices, such as the bag accepting device 401, the bag transport device 404, and/or the bag delivery device 405 of FIG. 4 and/or the baggage check device 501 of FIG. 5.

Figure 10:
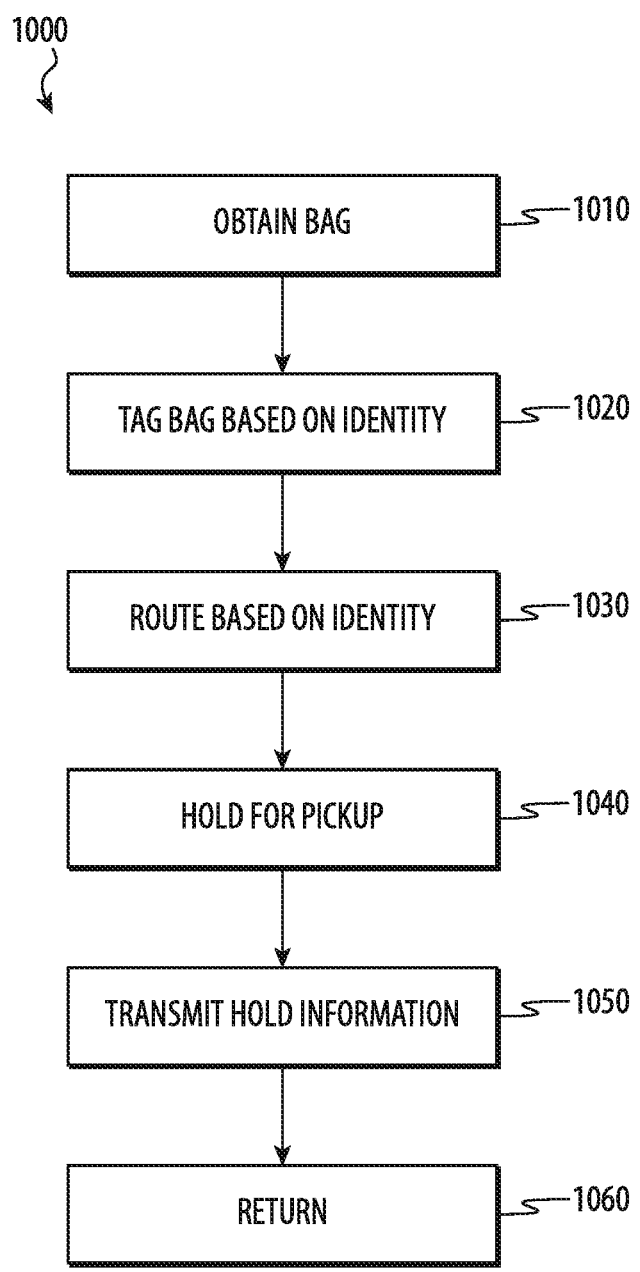
FIG. 10 depicts a flow chart illustrating a fifth example method for operating a biometric bag check system. The biometric bag check system may be the biometric bag check systems of FIGS. 4A-4E or FIG. 5.

FIG. 10 depicts a flow chart illustrating a fifth example method 1000 for operating a biometric bag check system. The biometric bag check system may be the biometric bag check systems 400, 500 of FIGS. 4A-4E or FIG. 5.

At 1010, a biometric bag check system obtains a bag. At 1020, the biometric bag check system tags the bag based on a determined identity. The flow then proceeds to 1030 where the biometric bag check system routes the bag according to the determined identity.

Next, at 1040, the biometric bag check system holds the bag for pickup. The biometric bag check system may hold the bag for pickup in a locker, on a baggage carousel, in the possession of an agent who will deliver the bag upon request, and so on.

The flow then proceeds to 1050 where the biometric bag check system transmits hold information. For example, the biometric bag check system may transmit a notification to a computing device (such as a mobile phone, an email address, and so on) associated with the identity. The notification may include instructions for pickup. Such instructions may include a location for pickup, information such as one or more passcodes or similar identifiers needed for pickup, and so on.

The flow may then proceed to 1060 where the biometric bag check system returns the bag.

Although the example method 1000 is illustrated and described as including particular operations performed in a particular order, it is understood that this is an example. In various implementations, various orders of the same, similar, and/or different operations may be performed without departing from the scope of the present disclosure.

For example, the method 1000 is illustrated and described as transmitting hold information after holding for pickup. However, in various implementations, the biometric bag check system may transmit hold information prior to holding the bag for pickup. For example, the biometric bag check system may identify a location where the bag will be held during routing. In such an example, the biometric bag check system may transmit the location as soon as the location is known. Various configurations are possible and contemplated without departing from the scope of the present disclosure.

In various examples, this example method 1000 may be implemented as a group of interrelated software modules or components that perform various functions discussed herein. These software modules or components may be executed by one or more computing devices, such as the bag accepting device 401, the bag transport device 404, and/or the bag delivery device 405 of FIG. 4 and/or the baggage check device 501 of FIG. 5.

Figure 11:
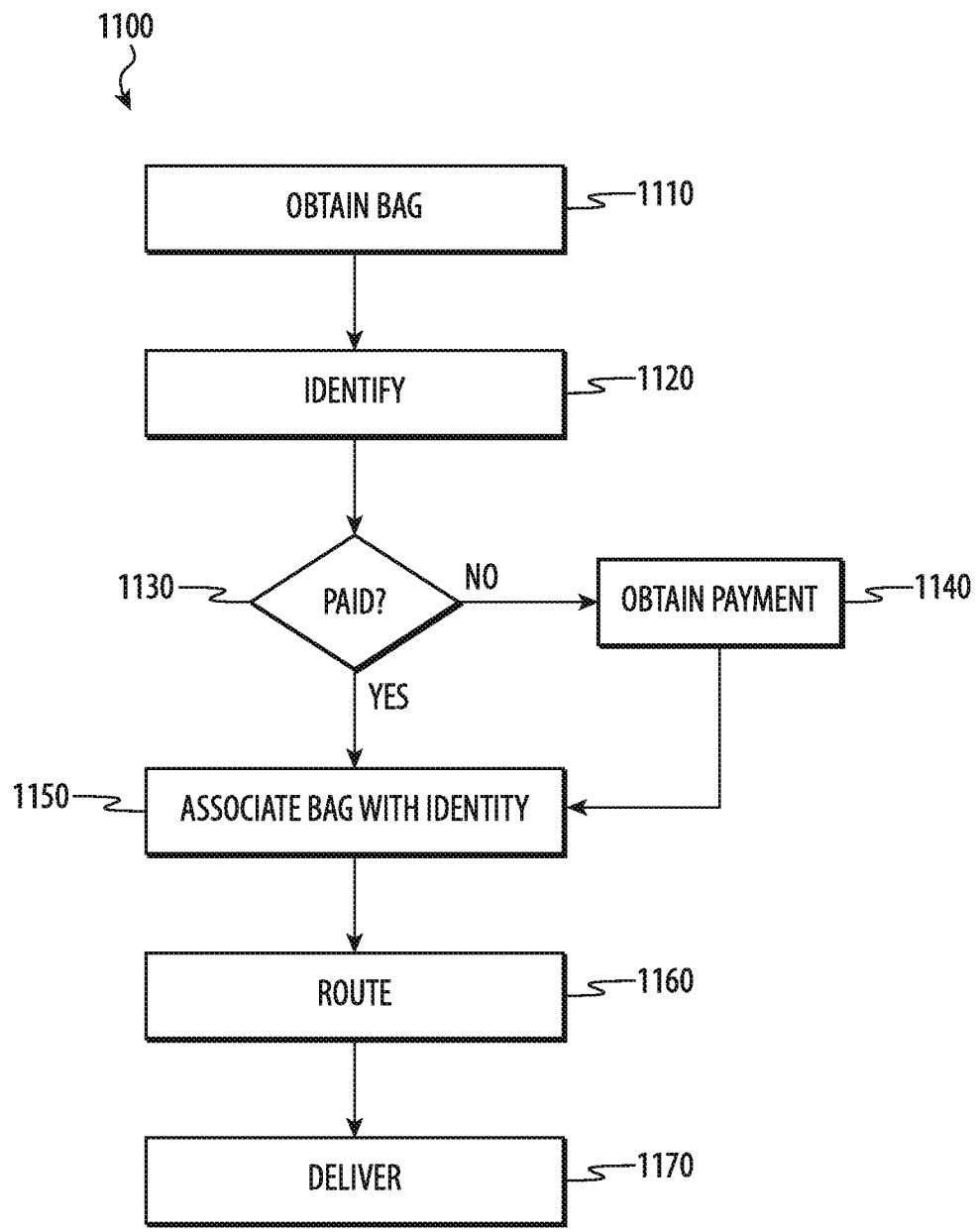
FIG. 11 depicts a flow chart illustrating a sixth example method for operating a biometric bag check system. The biometric bag check system may be the biometric bag check systems of FIGS. 4A-4E or FIG. 5.

FIG. 11 depicts a flow chart illustrating a sixth example method 1100 for operating a biometric bag check system. The biometric bag check system may be the biometric bag check systems 400, 500 of FIGS. 4A-4E or FIG. 5.

At 1110, a biometric bag check system may obtain a bag. At 1120, the biometric bag check system may determine an identity to associate with the bag. At 1130, the biometric bag check system may determine whether or not a payment for the bag is associated with the identity. If not, the flow may proceed to 1140 where the biometric bag check system arranges for payment before the flow proceeds to 1150. Otherwise, the flow may proceed directly to 1150.

For example, the biometric bag check system may communicate with an airline system to confirm that a payment for the bag has been made and associated with the identity. By way of another example, the biometric bag check system may itself obtain payment for the bag, such as using a credit card or bill reader associated with a bag accepting device. In yet another example, the biometric bag check system communicates with an identification system to arrange for payment. For example, the identification system may contact a payment processing system to process a payment using payment details associated with the identity. By way of another example, the identification system may create a credit account using biographic information (such as a name, address, social security number, and so on) associated with the identity and use the credit account to process payment.

At 1150, after the biometric bag check system determines a payment for the bag is associated with the identity, the biometric bag check system may associate the bag with the identity. The flow may then proceed to 1160 where the biometric bag check system may route the bag. Next, after transport of the bag, the flow proceeds to 1170 where the biometric bag check system may deliver the bag.

Although the example method 1100 is illustrated and described as including particular operations performed in a particular order, it is understood that this is an example. In various implementations, various orders of the same, similar, and/or different operations may be performed without departing from the scope of the present disclosure.

For example, the method 1100 is illustrated and described as determining payment prior to associating the bag with the identity. However, it is understood that this is an example. In various implementations, the order of these operations may be reversed and/or the operations may be performed simultaneously and/or substantially simultaneously. Various configurations are possible and contemplated without departing from the scope of the present disclosure.

In various examples, this example method 1100 may be implemented as a group of interrelated software modules or components that perform various functions discussed herein. These software modules or components may be executed by one or more computing devices, such as the bag accepting device 401, the bag transport device 404, and/or the bag delivery device 405 of FIG. 4 and/or the baggage check device 501 of FIG. 5.

Figure 12A:
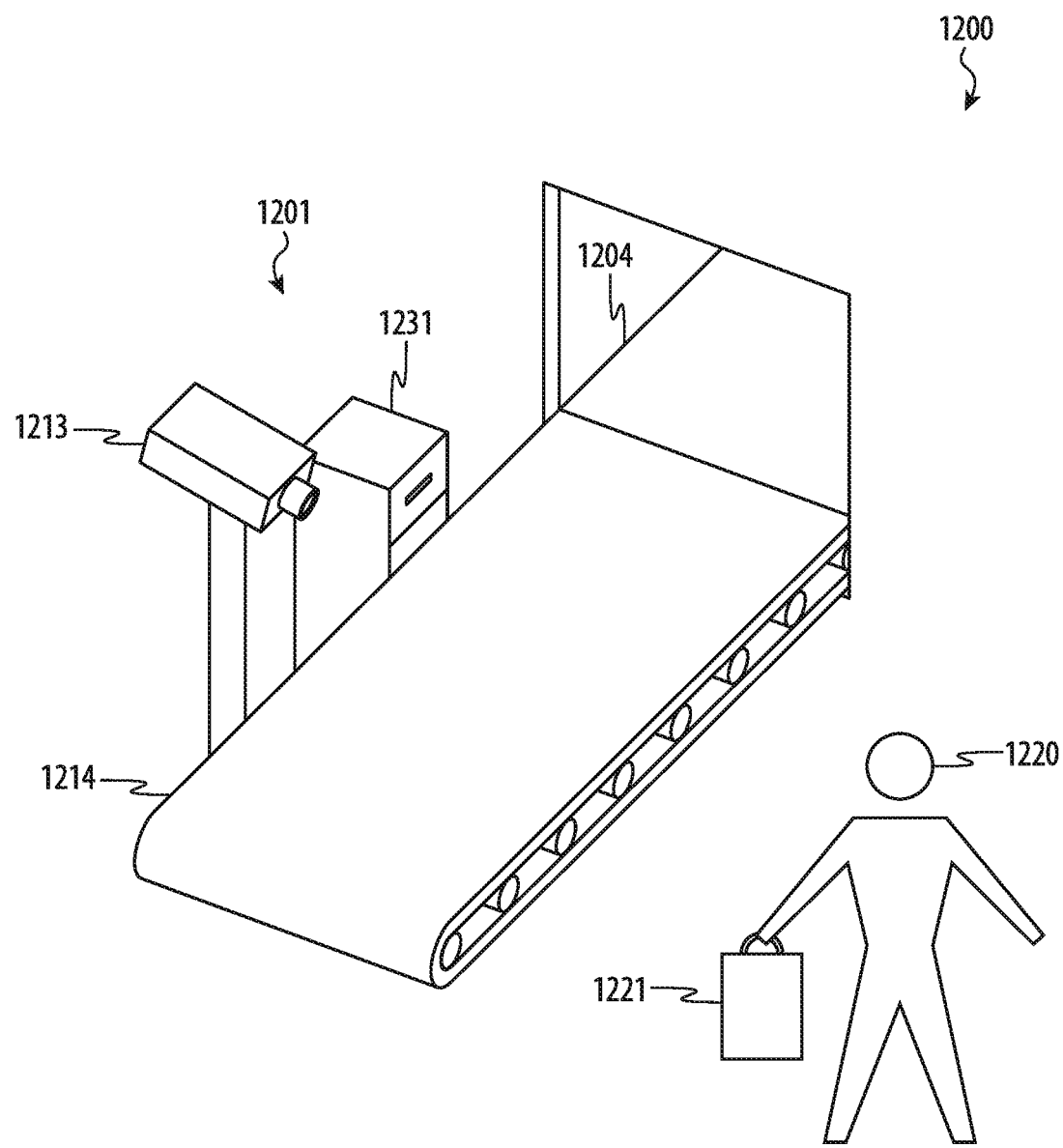
FIG. 12A depicts a portion of a second example of a biometric bag check system.

FIG. 12A depicts a portion of a second example of a biometric bag check system 1200. As illustrated, the biometric bag check system 1200 may include a bag accepting device 1201 and a bag transport device 1204. As contrasted with the bag accepting device 401 of FIG. 4, the bag accepting device 1201 does not physically restrict access to the bag 1221 upon obtaining the bag 1221. Similarly, physical access between the bag accepting device 1201 and an initial portion of a conveyor of the bag transport device 1204 is not directly restricted.

The bag accepting device 1201 includes a camera 1213, a conveyor belt 1214, and a tag dispenser 1231. The camera 1213 obtains one or more images (such as one or more images of a face, retina, iris, gait, and so on) of a person 1220 as the person approaches and places the bag 1221 on the conveyor belt 1214. The bag accepting device 1201 uses these images to obtain an identity for the person 1220. For example, the bag accepting device 1201 may obtain the identity as the person approaches to place the bag 1221 on the conveyor belt 1214.

Figure 12B:
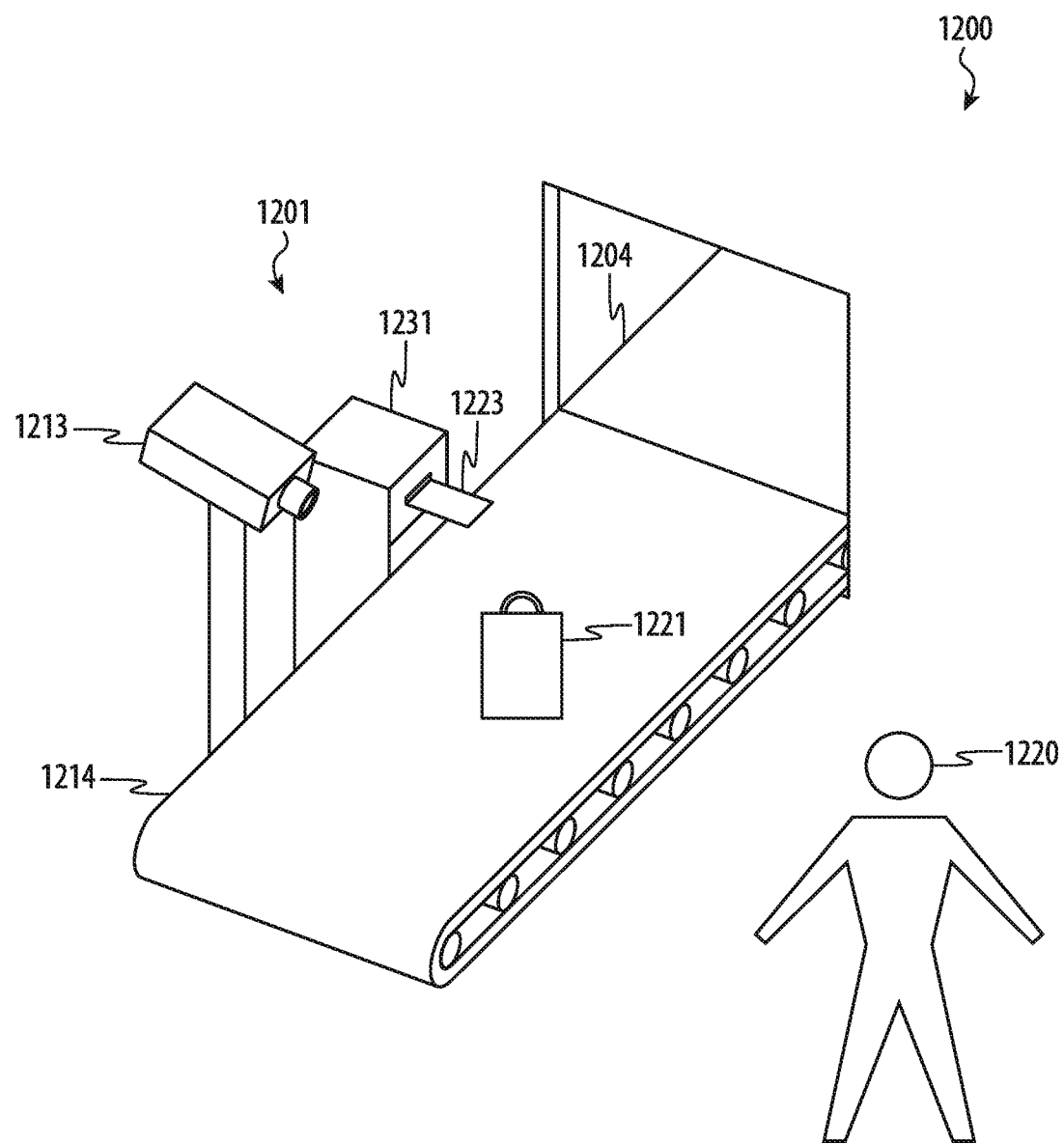
FIG. 12B depicts the biometric bag check system of FIG. 12A after the person places the bag on the conveyor belt of the bag accepting device.

FIG. 12B depicts the biometric bag check system 1200 of FIG. 12B after the person 1220 places the bag 1221 on the conveyor belt 1214 of the bag accepting device 1201. As illustrated, the tag dispenser 1231 may dispense a tag 1223 once the identity is determined, once the bag 1221 is on the conveyor belt 1214, and so on. The bag accepting device 1201 may associate the bag 1221 with the identity once the person 1220 places the tag 1223 on the bag 1221. The bag accepting device 1201 may use the camera 1213 to ensure that no other person interferes and/or that the person 1220 attaches the tag 1223 to the bag 1221.

Figure 12C:
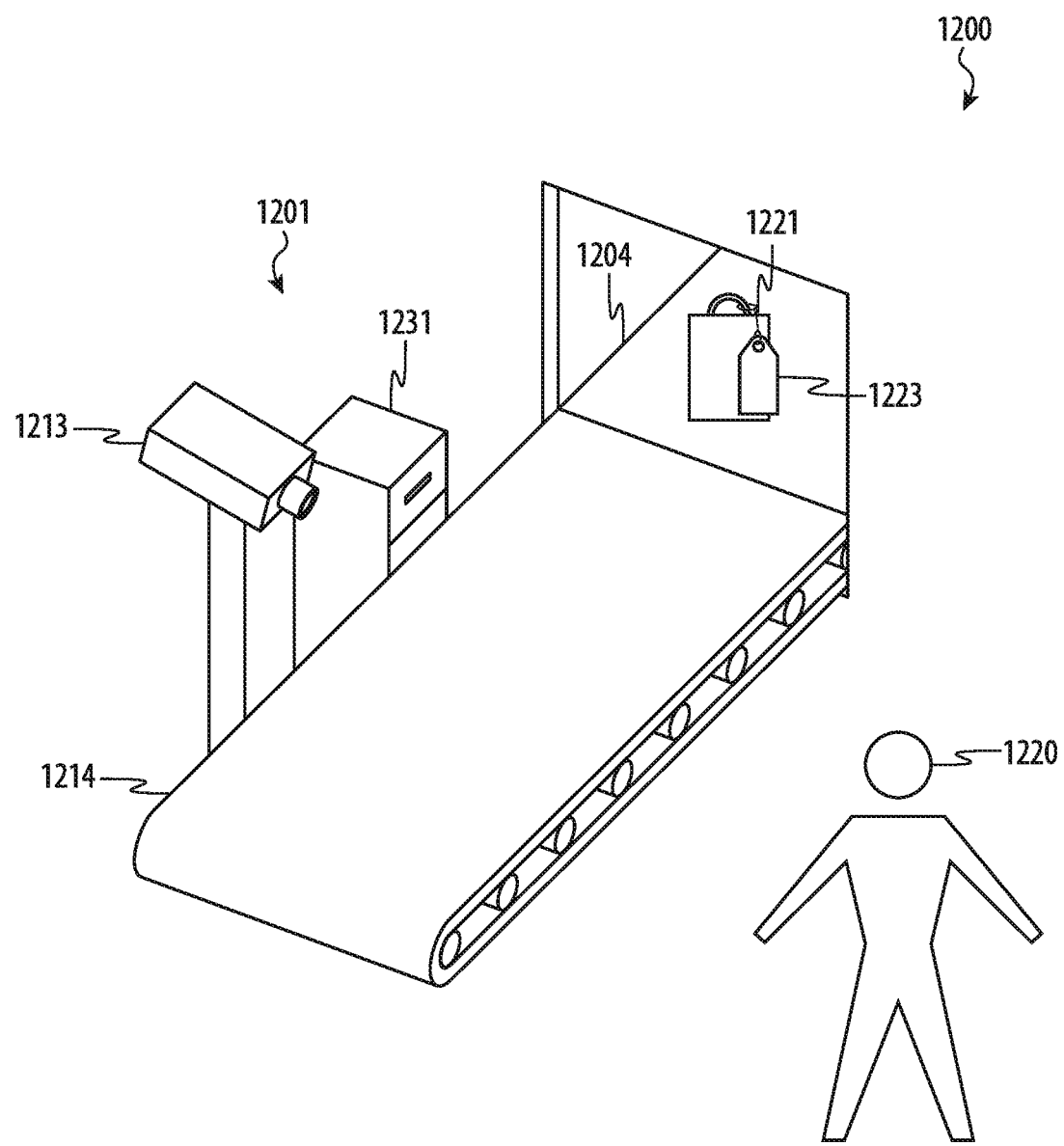
FIG. 12C depicts the biometric bag check system of FIG. 12B after the conveyor belt of the bag accepting device moves the bag to a conveyor belt of a bag transport device.

Once the bag accepting device 1201 determines that the bag 1221 is thus associated with the identity, the bag accepting device 1201 may route the bag 1221. For example, FIG. 12C depicts the biometric bag check system 1200 of FIG. 12C after the conveyor belt 1214 of the bag accepting device 1201 moves the bag 1221 to a conveyor belt of the bag transport device 1204.

Figure 13A:
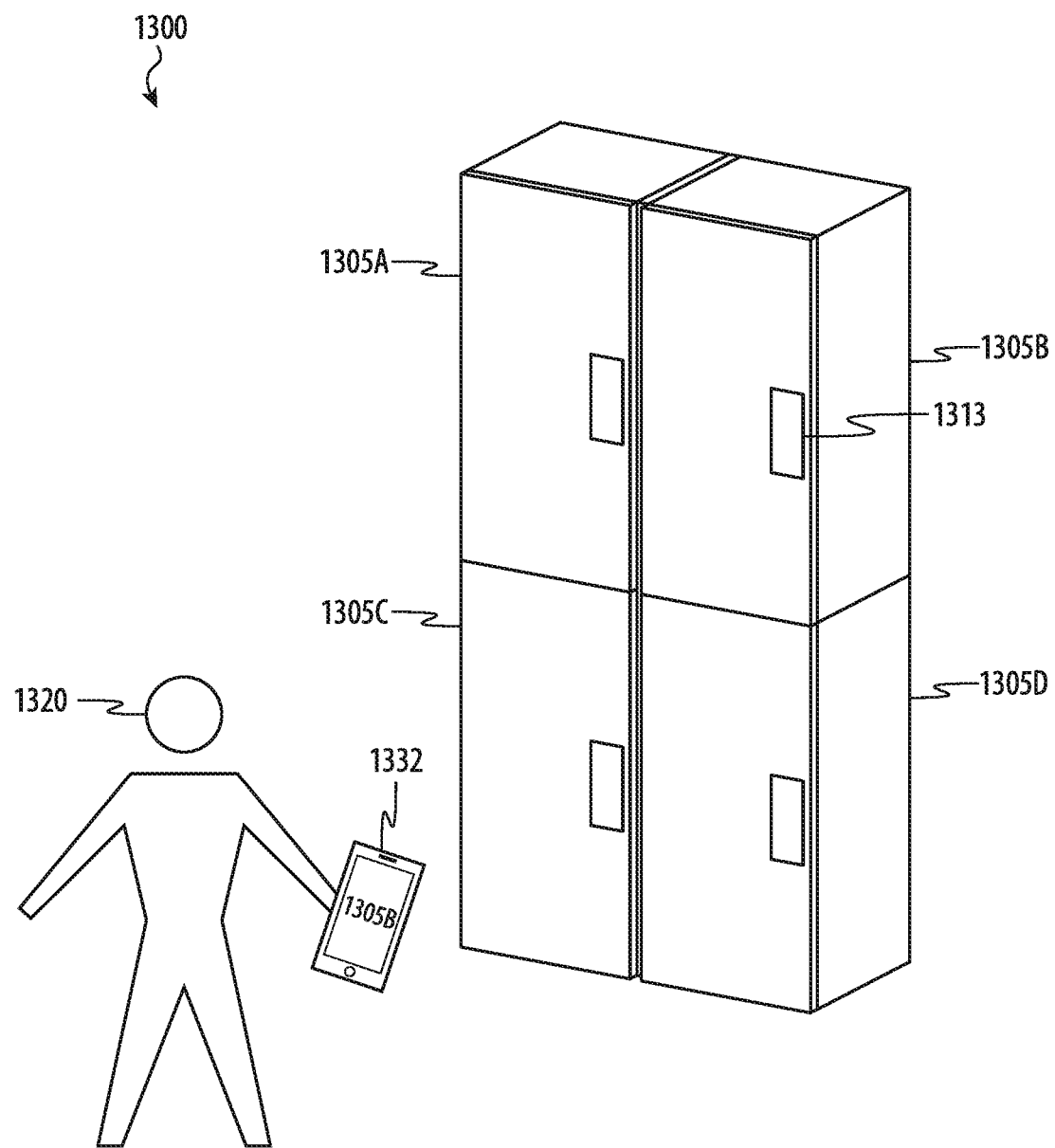
FIG. 13A depicts a portion of a third example of a biometric bag check system.

FIG. 13A depicts a portion of a third example of a biometric bag check system 1300. As compared to the baggage carousel illustrated in FIG. 4E, the biometric bag check system 1300 may include a baggage delivery device that includes a number of access controlled lockers 1305A-1305D. The biometric bag check system 1300 may route baggage to the lockers 1305A-1305D and then transmit one or more notifications to one or more computing devices associated with the appropriate identity regarding the location where bags can be claimed.

For example, a person 1320 may have a mobile phone 1332 associated with the person's identity in an identification system. The biometric bag check system 1300 may route the person's bag to a locker 1305B and transmit a notification to the mobile phone 1332 indicating that the person 1320 should claim the bag from the locker 1305B. The lockers 1305A-1305D may include a biometric reader device 1313 or other input device that the person 1320 can use to verify the person's identity.

Figure 13B:
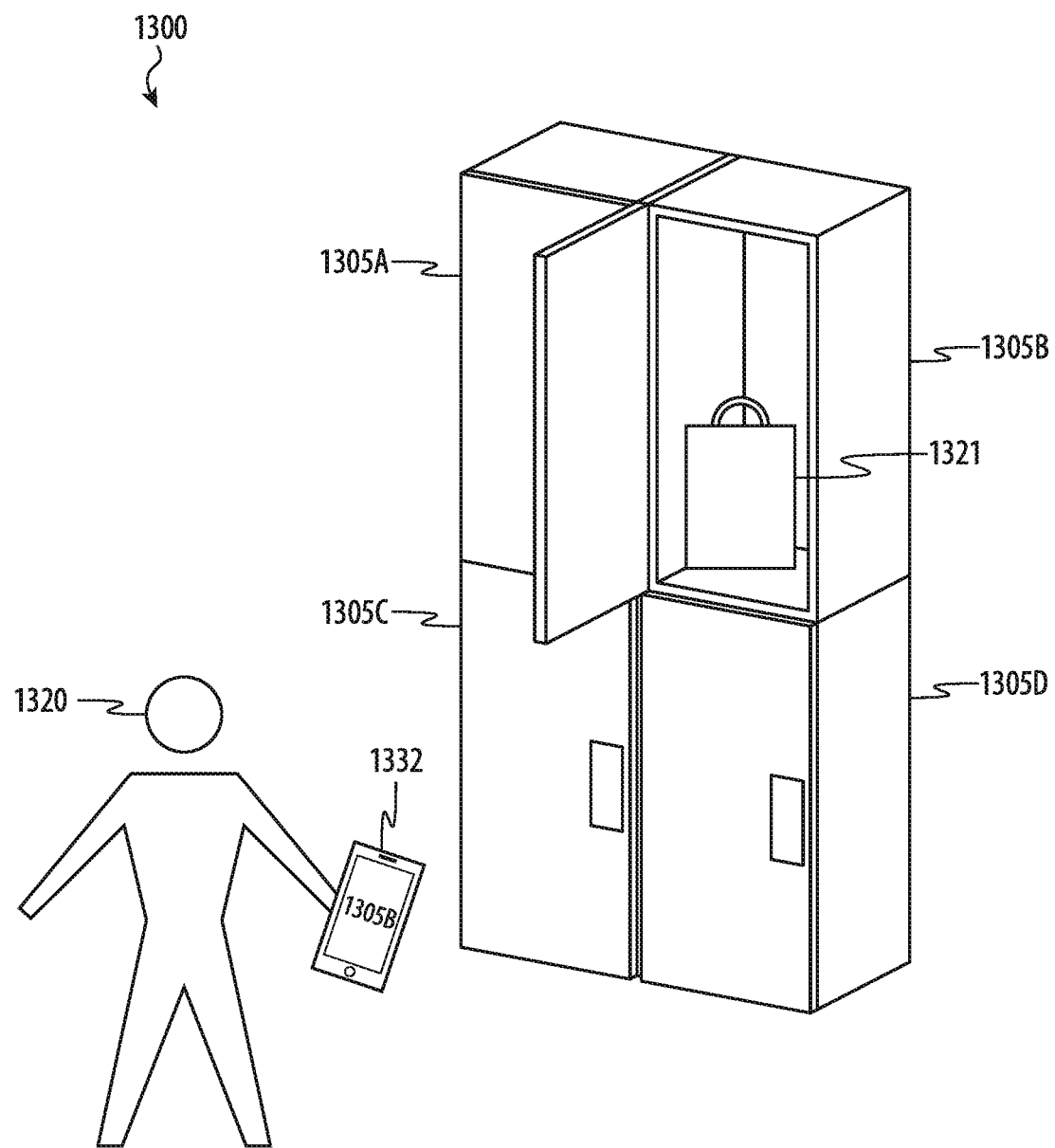
FIG. 13B depicts the biometric bag check system of FIG. 13A after the person opens the locker.

Once the person's identity is confirmed, the appropriate locker 1305B may open, as illustrated in FIG. 13B. As shown, the locker 1305B is open and the person 1320 can regain control of the bag 1321.

The above illustrates and describes baggage delivery as being performed by devices. For example, FIG. 4E illustrates baggage delivery as being performed by a baggage delivery device 405 (shown as a baggage carousel) and FIGS. 13A-13B illustrate baggage delivery as being performed by the lockers 1305A-1305B. However, it is understood that these are examples. In some implementations, personnel may perform baggage delivery. In various examples, the personnel may use a variety of different devices as part of performing baggage delivery.

As described above and illustrated in the accompanying figures, the present disclosure relates to a biometric bag check system. The biometric bag check system includes a number of interconnected components that obtain a bag, associate the bag with an identity, and route the bag from origin to destination according to the identity. This allows for a variety of additional functionality over typical systems while improving convenience for users and improving the efficiency of such systems and using fewer resources than were previously possible. Such functionality may include automated bag accepting devices, the ability to alter routing if people do not pass security or board flights, customized and/or secure bag delivery, and so on.

The present disclosure recognizes that biometric and/or other personal data is owned by the person from whom such biometric and/or other personal data is derived. This data can be used to the benefit of those people. For example, biometric data may be used to conveniently and reliably identify and/or authenticate the identity of people, access securely stored financial and/or other information associated with the biometric data, and so on. This may allow people to avoid repeatedly providing physical identification and/or other information.

The present disclosure further recognizes that the entities who collect, analyze, store, and/or otherwise use such biometric and and/or other personal data should comply with well-established privacy policies and/or privacy practices. Particularly, such entities should implement and consistently use privacy policies and practices that are generally recognized as meeting or exceeding industry or governmental requirements for maintaining security and privately maintaining biometric and/or other personal data, including the use of encryption and security methods that meets or exceeds industry or government standards. For example, biometric and/or other personal data should be collected for legitimate and reasonable uses and not shared or sold outside of those legitimate uses. Further, such collection should occur only after receiving the informed consent. Additionally, such entities should take any needed steps for safeguarding and securing access to such biometric and/or other personal data and ensuring that others with access to the biometric and/or other personal data adhere to the same privacy policies and practices. Further, such entities should certify their adherence to widely accepted privacy policies and practices by subjecting themselves to appropriate third party evaluation.

Additionally, the present disclosure recognizes that people may block the use of, storage of, and/or access to biometric and/or other personal data. Entities who typically collect, analyze, store, and/or otherwise use such biometric and and/or other personal data should implement and consistently prevent any collection, analysis, storage, and/or other use of any biometric and/or other personal data blocked by the person from whom such biometric and/or other personal data is derived.

Although particular methods involving particular operations have been illustrated and described, it is understood that these are examples. In various implementations, various arrangements of the same, similar, and/or different operations may be performed without departing from the scope of the present disclosure. Various configurations are possible and contemplated.

Aspects of the present disclosure may be performed by one or more devices, such as one or more computing devices, that may be configured as part of a system. For example, one or more computing devices that perform one or more aspects of this disclosure may be part of a cloud computing system, cooperative computing arrangement, and so on. Such devices may include one or more processors or other controllers or processing units, one or more non-transitory storage media (which may take the form of, but is not limited to, a magnetic storage medium; optical storage medium; magneto-optical storage medium; read only memory; random access memory; erasable programmable memory; flash memory; and so on), and/or other components. The processing unit may execute one or more instructions stored in the non-transitory storage medium to perform one or more processes that utilize one or more of the techniques disclosed herein.

In the present disclosure, the methods disclosed may be implemented as sets of instructions or software readable by a device. Further, it is understood that the specific order or hierarchy of steps in the methods disclosed are examples of sample approaches. In other embodiments, the specific order or hierarchy of steps in the method can be rearranged while remaining within the disclosed subject matter. The accompanying method claims present elements of the various steps in a sample order, and are not necessarily meant to be limited to the specific order or hierarchy presented.

The described disclosure may be provided as a computer program product, or software, that may include a non-transitory machine-readable medium having stored thereon instructions, which may be used to program a computer system (or other electronic devices) to perform a process according to the present disclosure. A non-transitory machine-readable medium includes any mechanism for storing information in a form (e.g., software, processing application) readable by a machine (e.g., a computer). The non-transitory machine-readable medium may take the form of, but is not limited to, a magnetic storage medium (e.g., floppy diskette, video cassette, and so on); optical storage medium (e.g., CD-ROM); magneto-optical storage medium; read only memory (ROM); random access memory (RAM); erasable programmable memory (e.g., EPROM and EEPROM); flash memory; and so on.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art that many modifications and variations are possible in view of the above teachings.

What is claimed is:

1. A biometric bag check system, comprising:
a bag accepting device operable to:
obtain control of a bag from a person;
obtain a digital representation of a biometric from the person;
determine an identity for the person by comparing the digital representation of the biometric to multiple sets of stored biometric data that are associated with multiple identities and stored in a biometric identification system,
wherein the identity for the person is further determined by the person providing data from a social media account, the data from the social media account including authentication information associated with the social media account;
verify flight information for the person by communicating with an airline system using identity information that is stored in association with the identity;
provide a tag that associates the bag with the identity;
use at least one monitoring device to track movement of the person from a biometric reader device that obtains the digital representation of the biometric to where the person attaches the tag to the bag and places the bag in a placement area from which the bag is not subsequently removed by the person; and
route the bag upon verification of the flight information;
a bag transport device operable to:
receive the bag from the bag accepting device; and
transport the bag;
detect an event related to the flight information other than whether a boarding pass is used;
reroute the bag in response to the event; and
a bag delivery device operable to:
receive the bag from the bag transport device; and
deliver the bag to the person via a locker that is operable to open to provide the bag in response to verification of the identity for the person using the biometric identification system.

2. The biometric bag check system of claim 1, wherein the biometric bag check system:
uses the identity information other than whether a boarding pass is used to determine whether the person passed a security checkpoint; and
determines whether to alter transport of the bag if the person did not pass the security checkpoint.

3. The biometric bag check system of claim 1, wherein the biometric bag check system:
uses the identity information other than whether a boarding pass is used to determine whether the person boarded a flight associated with the flight information; and
determines whether to alter transport of the bag if the person did not board the flight.

4. The biometric bag check system of claim 1, wherein the biometric bag check system determines whether to screen the bag based on the identity information other than whether a boarding pass is used.

5. The biometric bag check system of claim 1, wherein the bag accepting device tags the bag to associate the bag with the identity.

6. The biometric bag check system of claim 1, wherein the event comprises a flight cancellation, a flight rerouting, or a flight delay.

7. The biometric bag check system of claim 1, wherein the at least one monitoring device comprises at least one of a camera or a pressure sensor.

8. The biometric bag check system of claim 1, wherein the bag accepting device interrupts routing of the bag if the bag accepting device is unable to track movement of the person from the biometric reader device to where the person attaches the tag to the bag and places the bac in the placement area from which the bag is not subsequently removed by the person.

9. The biometric bag check system of claim 1, wherein:
the biometric bag check system uses the identity information to obtain contact information for an electronic device associated with the person; and
transmits a notification to the electronic device, using the contact information, that the bag is ready for delivery from the bag delivery device.

10. The biometric bag check system of claim 9, wherein the notification includes instructions to enable delivery.

11. The biometric bag check system of claim 1, wherein the bag accepting device verifies that control of the bag is obtained from a same person who provides the digital representation of the biometric prior to routing the bag.

12. The biometric bag check system of claim 1, wherein:
the person is a first person;
the flight information indicates that the first person has a ticket for a flight;
the flight information authorizes routing of the bag for a second person; and
the bag accepting device verifies that the flight information authorizes the first person to check the bag for the second person prior to routing the bag.

13. The biometric bag check system of claim 1, wherein the bag accepting device includes the biometric reader device that is operable to obtain the digital representation of the biometric from the person.

14. The biometric bag check system of claim 1, wherein the bag accepting device prevents the person from accessing the bag prior to routing after obtaining control.

15. The biometric bag check system of claim 1, wherein:
the digital representation of the biometric is a first digital representation of the biometric; and
the bag delivery device:
obtains a second digital representation of the biometric for the person;
uses the second digital representation of the biometric to verify the identity of the person with the biometric identification system; and
provides the bag upon verification of the identity.

16. The biometric bag check system of claim 1, wherein:
the digital representation of the biometric is a first digital representation of a biometric; and
the locker is operable to open to provide the bag in response to receiving a second digital representation of a biometric from the person.

17. A biometric bag check system, comprising:
at least one non-transitory storage medium that stores instructions; and
at least one processor that executes the instructions to:
obtain control of a bag from a person;
obtain a digital representation of a biometric for the person;
determine an identity for the person by comparing the digital representation of the biometric to multiple sets of stored biometric data that are associated with multiple identities and stored in a biometric identification system,
wherein the identity for the person is further determined by the person providing data from a social media account, the data from the social media account including authentication information associated with the social media account;
obtain flight information for the person by communicating with an airline system using identity information that is stored in association with the identity;
provide a tag that associates the bag with the identity;
use at least one monitoring device to track movement of the person from a biometric reader device that obtains the digital representation of the biometric to where the person attaches the tag to the bag and places the bag in a placement area from which the bag is not subsequently removed by the person;
route the bag using the flight information;
transport the bag;
detect an event related to the flight information other than whether a boarding pass is used;
reroute the bag in response to the event; and
provide the bag to the person via a locker that is operable to open to provide the bag in response to verification of the identity for the person using the biometric identification system.

18. The biometric bag check system of claim 17, wherein the event comprises a change to a flight.

19. A method of operating a biometric bag check system, comprising:
obtaining control of a bag from a person using a bag accepting device;
obtaining a digital representation of a biometric for the person;
determining an identity for the person by comparing the digital representation of the biometric to multiple sets of stored biometric data that are associated with multiple identities and stored in a biometric identification system,
wherein the identity for the person is further determined by the person providing data from a social media account, the data from the social media account including authentication information associated with the social media account;
obtaining flight information for the person by communicating with an airline system using identity information that is stored in association with the identity;
providing a tag that associates the bag with the identity;
using at least one monitoring device to track movement of the person from a biometric reader device that obtains the digital representation of the biometric to where the person attaches the tag to the bag and places the bag in a placement area from which the bag is not subsequently removed by the person;
routing the bag using the flight information;
transporting the bag using a bag transport device;
detecting an event related to the flight information other than whether a boarding pass is used;

rerouting the bag in response to the event; and
providing the bag to the person using a bag delivery device comprising a locker that is operable to open to provide the bag in response to verification of the identity for the person using the biometric identification system.

20. The method of claim 19, wherein the event comprises a flight cancellation, a flight rerouting, or a flight delay.

\* \* \* \* \*